United States Patent
Bae et al.

(10) Patent No.: US 12,238,770 B2
(45) Date of Patent: Feb. 25, 2025

(54) METHOD, TRANSMISSION DEVICE, AND RECORDING MEDIUM FOR TRANSMITTING TRANSPORT BLOCK IN UNLICENSED BAND

(71) Applicant: LG Electronics Inc., Seoul (KR)

(72) Inventors: Duckhyun Bae, Seoul (KR); Hyunho Lee, Seoul (KR); Suckchel Yang, Seoul (KR); Seonwook Kim, Seoul (KR); Changhwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 436 days.

(21) Appl. No.: 17/635,615

(22) PCT Filed: Aug. 13, 2020

(86) PCT No.: PCT/KR2020/010780
§ 371 (c)(1),
(2) Date: Feb. 15, 2022

(87) PCT Pub. No.: WO2021/029708
PCT Pub. Date: Feb. 18, 2021

(65) Prior Publication Data
US 2022/0312483 A1    Sep. 29, 2022

(30) Foreign Application Priority Data
Aug. 15, 2019  (KR) ............ 10-2019-0099968

(51) Int. Cl.
*H04W 74/0816* (2024.01)
*H04L 1/08* (2006.01)
(Continued)

(52) U.S. Cl.
CPC ........... *H04W 74/0816* (2013.01); *H04L 1/08* (2013.01); *H04W 72/0453* (2013.01); *H04W 74/0866* (2013.01)

(58) Field of Classification Search
CPC ....... H04L 1/08; H04L 1/1861; H04L 1/1864; H04L 1/189; H04W 72/0453; H04W 74/0808; H04W 74/0816; H04W 74/0866
See application file for complete search history.

(56) References Cited

U.S. PATENT DOCUMENTS

2016/0174259 A1* 6/2016 Mukherjee ................ H04L 1/08
370/280
2017/0265193 A1* 9/2017 Wang ...................... H04W 4/70
(Continued)

FOREIGN PATENT DOCUMENTS

KR        20180005286        1/2018

OTHER PUBLICATIONS

International Search Report & Written Opinion in International Appln. No. PCT/KR2020/010780, dated Nov. 25, 2020, 8 pages (with English translation).
(Continued)

*Primary Examiner* — Kibrom T Hailu
*Assistant Examiner* — Kai Chang
(74) *Attorney, Agent, or Firm* — Fish & Richardson P.C.

(57) ABSTRACT

A transmission device may perform listen-before-talk (LBT) with regard to an unlicensed band. The transmission device may determine M LBT sub-bands which are in an idle state, on the basis of the performing of the LBT for the unlicensed band. The transmission device may perform N repetitive transmissions of a transport block (TB) over the M LBT sub-bands. The N repetitive transmissions of the TB may include performing M repetitive transmissions over the M LBT sub-bands, respectively.

19 Claims, 14 Drawing Sheets

(51) Int. Cl.
*H04W 72/0453* (2023.01)
*H04W 74/08* (2024.01)

(56) References Cited

U.S. PATENT DOCUMENTS

| | | | |
|---|---|---|---|
| 2019/0132882 A1 | 5/2019 | Li et al. | |
| 2019/0335385 A1* | 10/2019 | Zhang | H04W 48/12 |
| 2020/0213989 A1* | 7/2020 | Choi | H04L 5/0007 |
| 2021/0250142 A1* | 8/2021 | Wang | H04L 5/0053 |
| 2022/0045814 A1* | 2/2022 | Xu | H04L 5/0048 |
| 2022/0078624 A1* | 3/2022 | Hong | H04W 74/0808 |
| 2022/0256607 A1* | 8/2022 | Liu | H04W 74/0833 |

OTHER PUBLICATIONS

Nokia & Nokia Shanghai Bell, "On Enhancements to Initial Access Procedures for NR-U," R1-1902125, Presented at 3GPP TSG RAN WG1 Meeting #96, Athens, Greece, Feb. 25-Mar. 1, 2019, 16 pages.

Samsung, "Uplink signal and channel design for NR-U," R1-1906919, Presented at 3GPP TSG RAN WG1 #97, Reno, USA, May 13-17, 2019, 7 pages.

Vivo, "Discussion on wideband operation in NR-U," R1-1906134, Presented at 3GPP TSG RAN WG1#97, Reno, USA, May 13-17, 2019, 7 pages.

* cited by examiner

FIG. 10
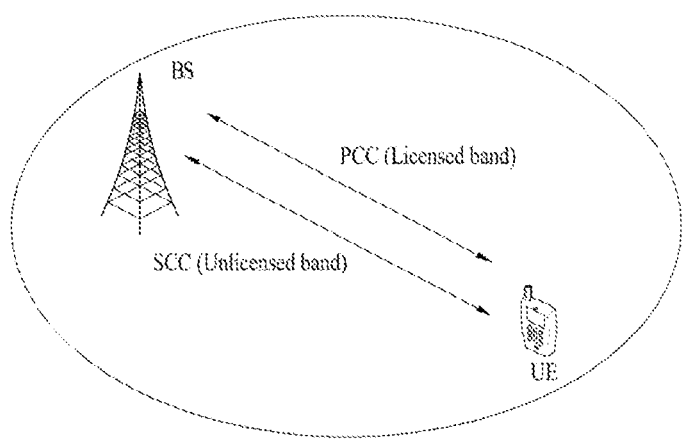
(a) Carrier aggregation between L-band and U-band
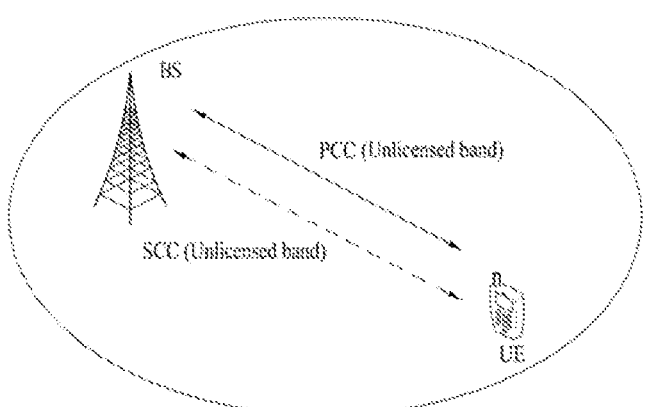
(b) Standalone U-band(s)

METHOD, TRANSMISSION DEVICE, AND RECORDING MEDIUM FOR TRANSMITTING TRANSPORT BLOCK IN UNLICENSED BAND

CROSS-REFERENCE TO RELATED APPLICATIONS

This application is a National Stage application under 35 U.S.C. § 371 of International Application No. PCT/KR2020/010780, filed on Aug. 13, 2020, which claims the benefit of Korean Application No. 10-2019-0099968, filed on Aug. 15, 2019. The disclosures of the prior applications are incorporated by reference in their entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at any time and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Problem

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solution

In one aspect of the present disclosure, provided herein is a method for transmitting a transport block (TB) in an unlicensed band by a transmission device in a wireless communication system. The method may include determining M idle Listen Before Talk (LBT) subbands based on performing LBT for the unlicensed band, where M>1; and performing N repeated transmissions for the TB in the M LBT subbands, where N>M. The N repeated transmissions for the TB may include M repeated transmissions performed in the M LBT subbands, respectively.

In another aspect of the present disclosure, provided herein is a transmission device for transmitting a transport block (TB) in an unlicensed band in a wireless communication system. The transmission device may include at least one transceiver; at least one processor; and at least one computer memory operably connectable to the at least one processor and having stored thereon instructions that, when executed, cause the at least one processor to perform operations. The operations may include determining M idle Listen Before Talk (LBT) subbands based on performing LBT for the unlicensed band, where M>1; and performing N repeated transmissions for the TB in the M LBT subbands, where N>M. The N repeated transmissions for the TB may include M repeated transmissions performed in the M LBT subbands, respectively.

In another aspect of the present disclosure, provided herein is a processing device for a transmission device. The processing device includes at least one processor; and at least one computer memory operably connectable to the at least one processor and having stored thereon instructions that, when executed, cause the at least one processor to perform operations. The operations may include determining M idle Listen Before Talk (LBT) subbands based on performing LBT for an unlicensed band, where M>1; and performing N repeated transmissions for a transport block (TB) in the M LBT subbands, where N>M. The N repeated transmissions for the TB may include M repeated transmissions performed in the M LBT subbands, respectively.

In another aspect of the present disclosure, provided herein is a computer-readable storage medium. The computer-readable storage medium has stored thereon at least one computer program including instructions that, when executed by at least one processor, cause the at least one processor to perform operations for a user equipment. The operations may include determining M idle Listen Before Talk (LBT) subbands based on performing LBT for an unlicensed band, where M>1; and performing N repeated transmissions for a transport block (TB) in the M LBT subbands, where N>M. The N repeated transmissions for the TB may include M repeated transmissions performed in the M LBT subbands, respectively.

In each aspect of the present disclosure, N may be configured by a higher layer signal.

In each aspect of the present disclosure, N may be indicated by a physical layer signal.

In each aspect of the present disclosure, performing the N repeated transmissions for the TB in the M LBT subbands may include: transmitting the TB with different redundancy versions.

In each aspect of the present disclosure, the transmission device may receive frequency domain resource allocation (FDRA) for one LBT subband. The transmission device may determine frequency resource allocation for each of the M LBT subbands based on the FDRA.

In each aspect of the present disclosure, the transmission device may transmit frequency domain resource allocation (FDRA) for one LBT subband. The transmission device may determine frequency resource allocation for each of the M LBT subbands based on the FDRA.

In each aspect of the present disclosure, the N repeated transmissions for the TB may be performed on M*K frequency-time resources defined by the M LBT subbands in a frequency domain and K time units in a time domain, where K=ceil(N/M).

In each aspect of the present disclosure, the N repeated transmissions for the TB may be performed on M*K time-frequency resources and N-M*K frequency-time resources defined by the M LBT subbands in a frequency domain and K time units in a time domain, where K=floor(N/M).

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure:

FIG. 10 illustrates a wireless communication system supporting an unlicensed band applicable to some implementations of the present disclosure;

MODE FOR INVENTION

Figure 1:
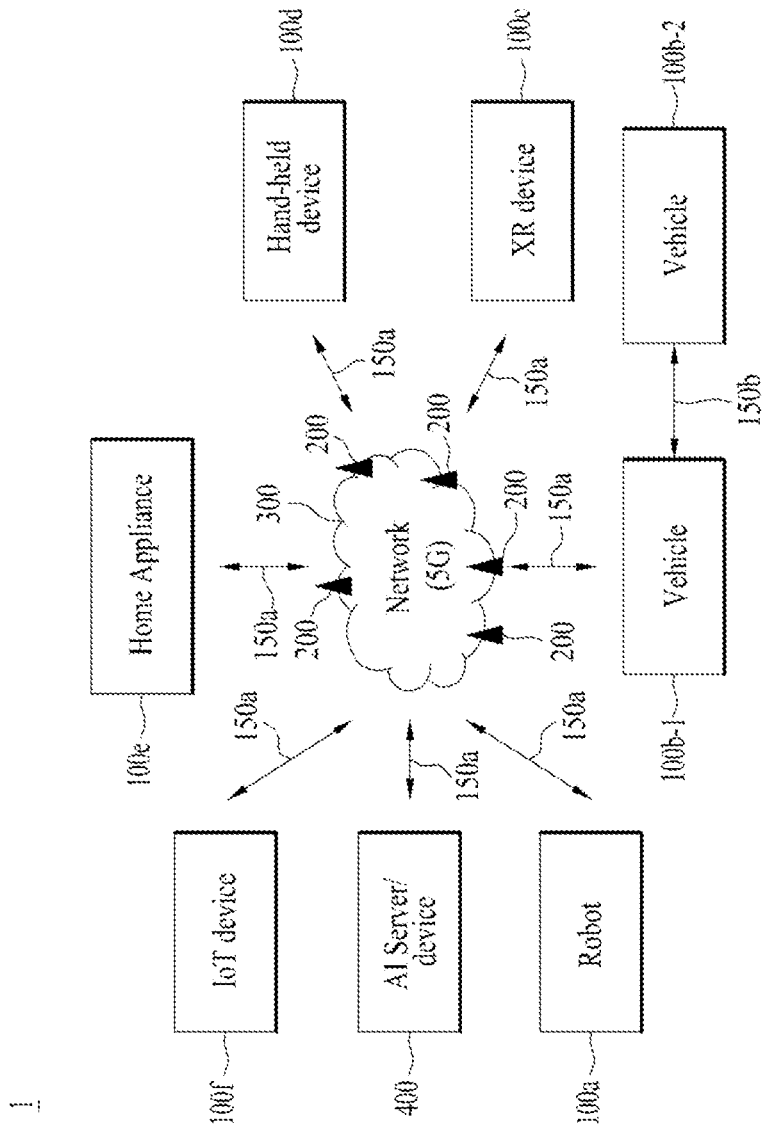
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC CONNECTED state, not configured with CA or DC, only one serving cell including only the Pcell is present. For a UE in RRC CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An Scell indicated as the PUCCH Scell belongs to the Scell PUCCH group and PUCCH transmission of related UCI is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resource elements (REs) that carry downlink control information (DCI), and the PDSCH refers to a set of REs that carry DL data. The PUCCH, PUSCH, and PRACH refer to a set of time-frequency REs that carry uplink control information (UCI), UL data, and random access signals, respectively. In the following description, the meaning of "The UE transmits/receives the PUCCH/PUSCH/PRACH" is that the UE transmits/receives the UCI/UL data/random access signals on or through the PUCCH/PUSCH/PRACH, respectively. In addition, the meaning of "the BS transmits/receives the PBCH/PDCCH/PDSCH" is that the BS transmits the broadcast information/DCI/DL data on or through a PBCH/PDCCH/PDSCH, respectively.

In the present disclosure, a radio resource (e.g., a time-frequency resource) scheduled or configured for the UE by the BS for transmission or reception of PUCCH/PUSCH/PDSCH is also referred to as a PUCCH/PUSCH/PDSCH resource.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of Things (IoT) device 100f, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless may operate as a B S/network node with respect to another wireless device.

The wireless devices 100a to 100f may be connected to a network 300 via BSs 200. AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f and the BSs 200 and between the wireless devices 100a to 100f). Here, the wireless communication/connections such as UL/DL communication 150a and sidelink communication 150b (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
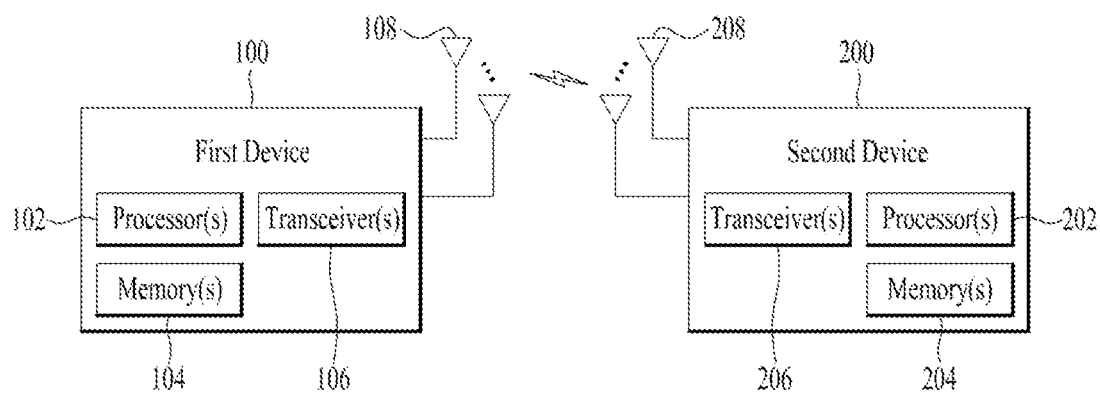
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of Things for low-power communication as well as LTE, NR, and 6G communications. For example, NB-IoT technology may be an example of Low Power Wide Area Network (LPWAN) technology, and may be implemented by, but is not limited to, standards such as LTE Cat NB1 and/or LTE Cat NB2. Additionally or alternatively, the wireless communication technology implemented in the wireless devices XXX and YYY of the present disclosure may perform communication based on the LTE-M technology. For example, the LTE-M technology may be an example of the LPWAN technology, and may be called by various names such as enhanced machine type communication (eMTC). For example, the LTE-M technology may be implemented by, but is not limited to, at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M. Additionally or alternatively, the wireless communication technology implemented in the wireless devices XXX and YYY of the present disclosure may include, but is not limited to, at least one of ZigBee, Bluetooth, and Low Power Wide Area Network (LPWAN) considering low-power communication. For example, the ZigBee technology may create personal area networks (PAN) related to small/low-power digital communications based on various standards such as IEEE 802.15.4, and may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
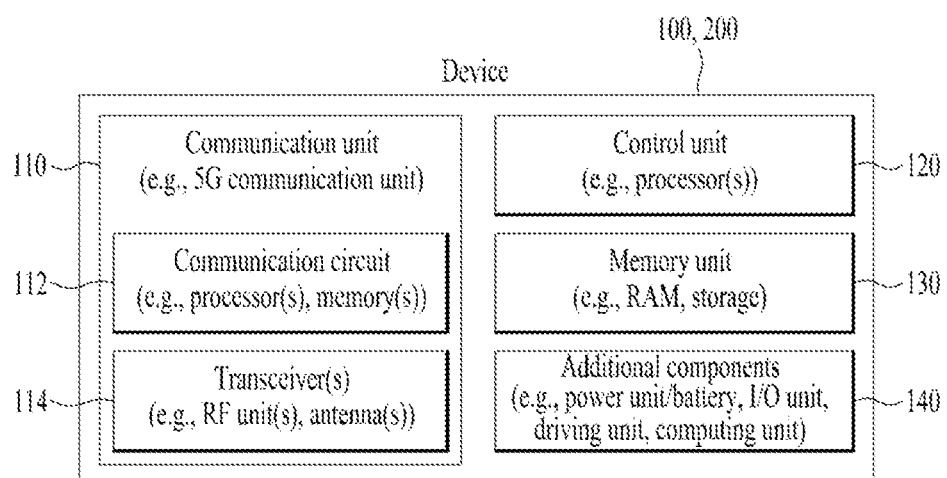
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114.

For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
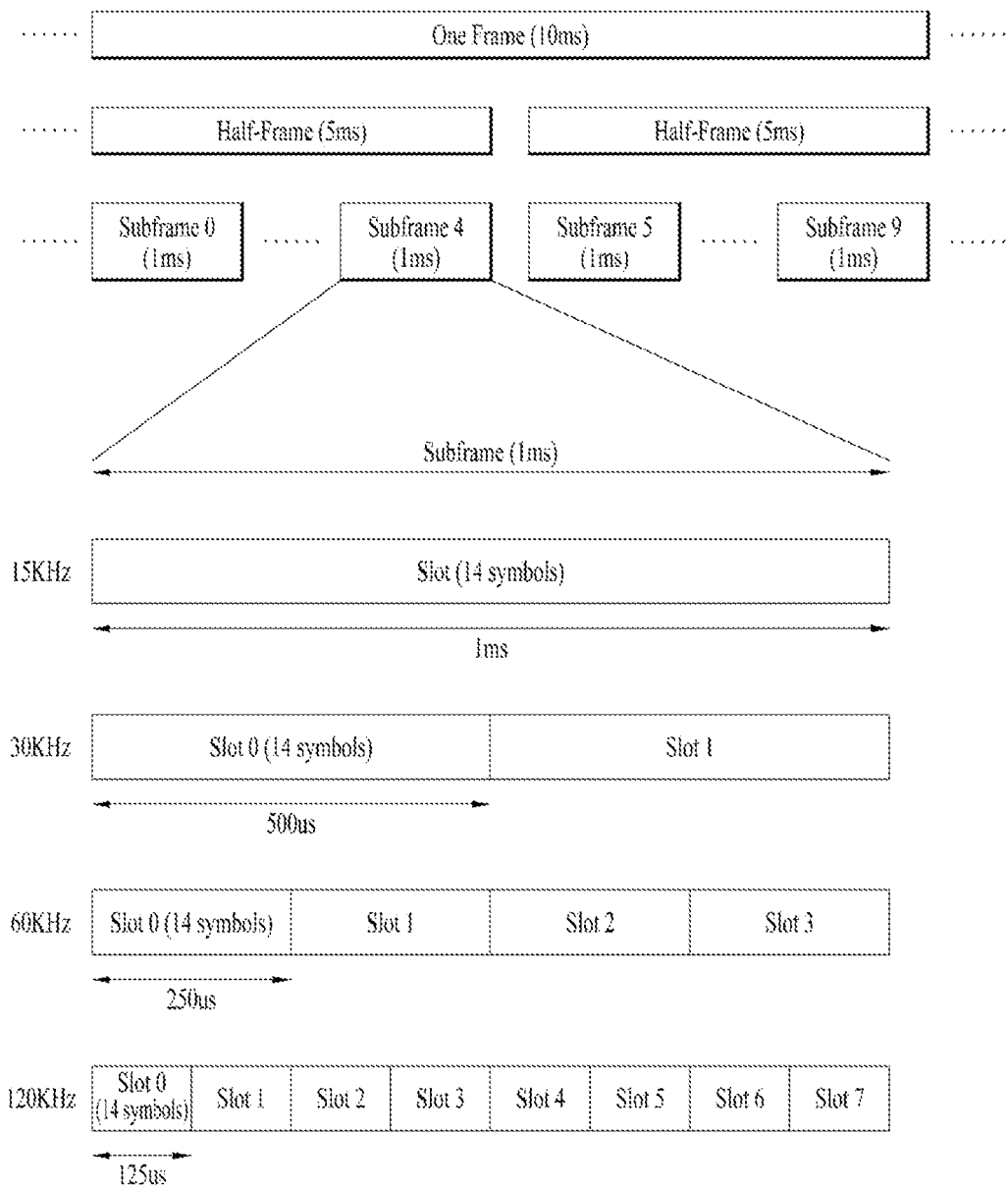
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f = (\Delta f_{max} * N_f / 100) * T_c = 10$ ms and is divided into two half-frames of 5 ms each. A basic time unit for NR is $T_c = 1/(\Delta f_{max} * N_f)$ where $\Delta f_{max} = 480*10^3$ Hz and $N_f = 4096$. For reference, a basic time unit for LTE is $Ts = 1/(\Delta f_{ref} * N_{f,ref})$ where $\Delta f_{ref} = 15*10^3$ Hz and $N_{f,ref} = 2048$. $T_c$ and $T_f$ have the relationship of a constant $\kappa = T_s/T_c = 64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For the search space configuration u, slots are numbered as $n^u_s \in \{0, \ldots, n^{subframe,u}_{slot}-1\}$ in ascending order within a subframe and as $n^u_{s,f} \in \{0, \ldots, n^{frame,u}_{slot}-1\}$ in ascending order within a frame.

Figure 5:
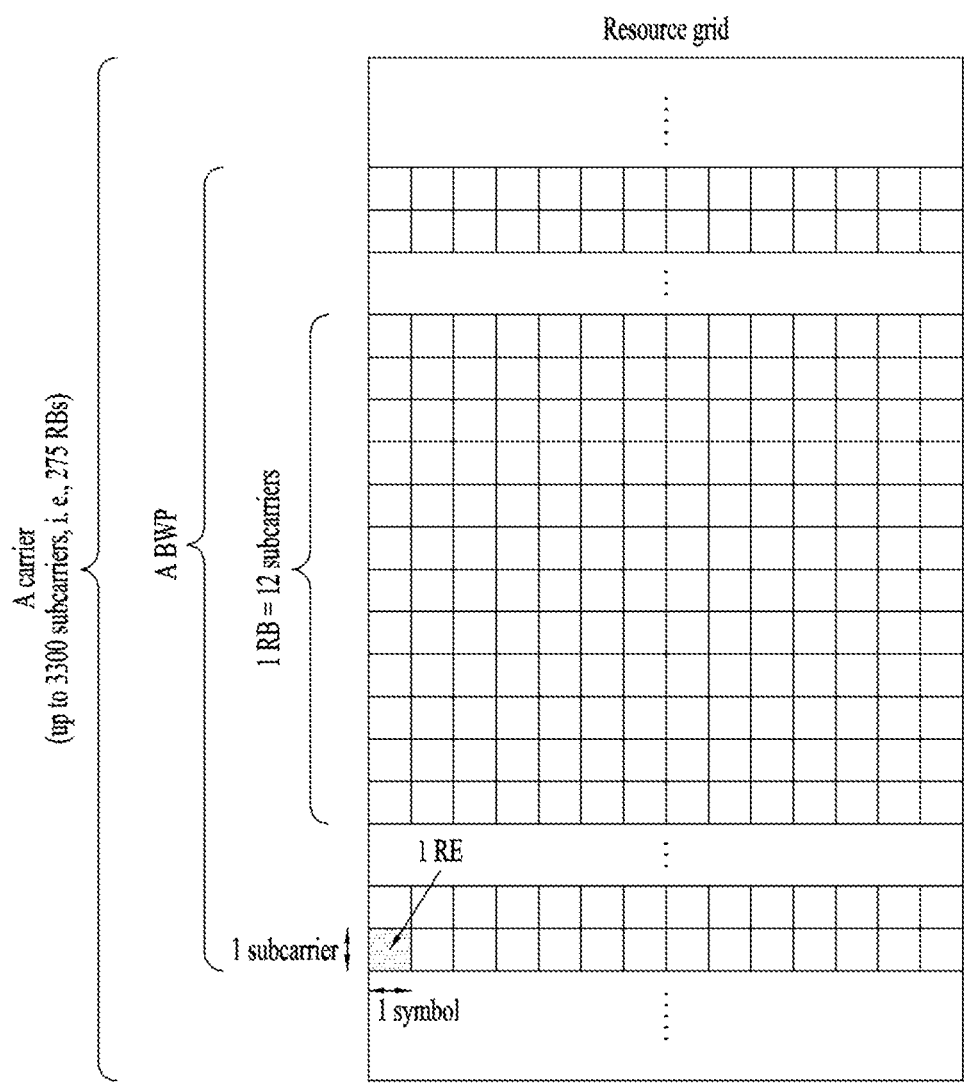
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^u_{CRB}$ is given by: $n^u_{PRB} = n^u_{CRB} + N^{size,u}_{BWP,i}$, where $N^{size}_{BWP,i}$ is a CRB in which the BWP starts relative to CRB 0. The BWP includes a plurality of consecutive RBs in the frequency domain. For example, the BWP is a subset of contiguous CRBs defined for given neurology $u_i$ in BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in the set of DL BWPs or UL BWPs, the network configures at least an initial DL BWP and one (when the serving cell is configured with uplink) or two (when supplementary uplink is used) initial UL BWPs. The network may configure additional UL and DL BWPs for the serving cell. For each DL BWP or UL BWP, the UE is provided with the following parameters for the serving cell: $O_{carrier}$ provided by an RRC parameter offsetToCarrier for CRB $N^{start}_{BWP} = O_{carrier} + RB_{start}$, the number of contiguous RBs $N^{size}_{BWP} = L_{RB}$, and subcarrier spacing, provided by an RRC parameter locationAndBandwidth indicating offset $RB_{set}$ and length $L_{RB}$ as resource indicator values (RIVs) based on i) subcarrier spacing; ii) cyclic prefix; iii) the assumption that $N^{start}_{BWP} = 275$; an index in the set of the DL BWPs or UL BWPs; a set of BWP-common parameters and a set of BWP-only parameters.

Virtual resource blocks (VRBs) are defined in a BWP and are numbered from 0 to $N^{size,u}_{BWP,i}-1$, where i is the number of the BWP. The VRBs are mapped to physical resource blocks (PRBs) according to non-interleaved mapping. In some implementations, in non-interleaved VRB-to-PRB mapping, VRB n may be mapped to PRB n.

Figure 6:
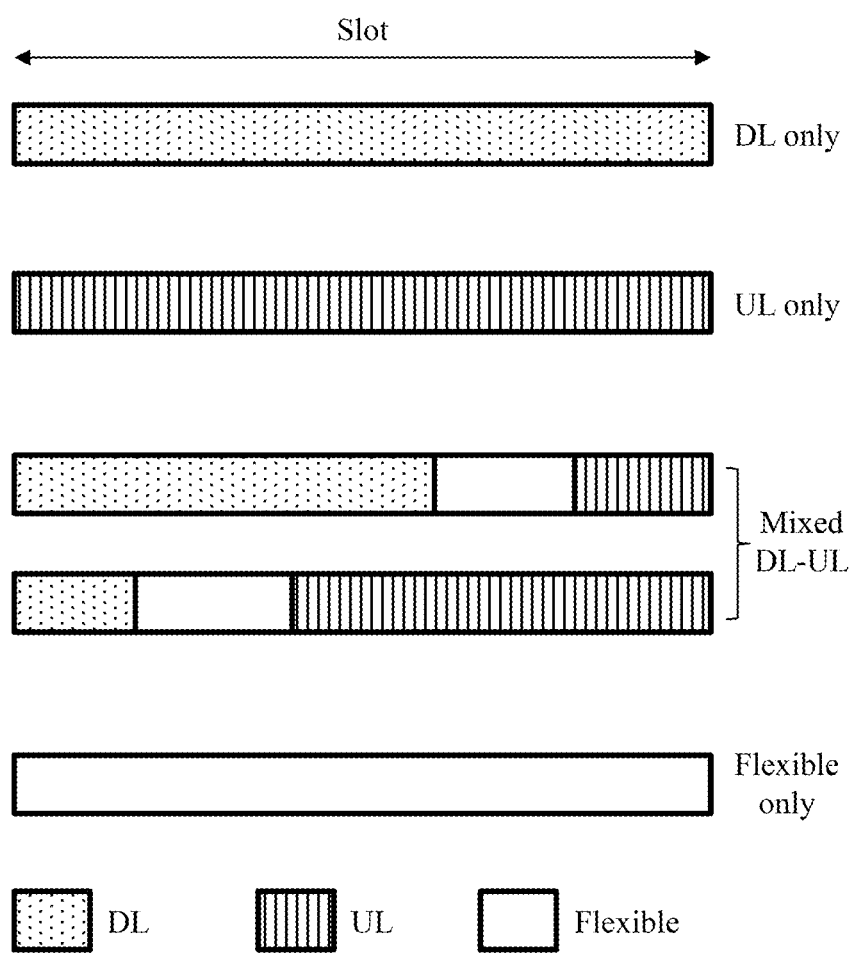
FIG. 6 illustrates slot structures used in a 3GPP-based system.

FIG. 6 illustrates slot structures used in a 3GPP-based system. In all 3GPP-based systems, for example, in an NR system, each slot may have a self-contained structure including i) a DL control channel, ii) DL or UL data, and/or iii) a UL control channel. For example, the first N symbols in a slot may be used to transmit the DL control channel (hereinafter, DL control region) and the last M symbols in a slot may be used to transmit the UL control channel (hereinafter, UL control region), where N and M are integers other than negative numbers. A resource region (hereinafter, data region) between the DL control region and the UL control region may be used to transmit DL data or UL data. Symbols in a single slot may be divided into group(s) of consecutive symbols that may be used as DL symbols, UL symbols, or flexible symbols. Hereinbelow, information indicating how each symbol in slot(s) is used will be referred to as a slot format. For example, which symbols in slot(s) are used for UL and which symbols in slot(s) are used for DL may be defined by a slot format.

When a BS intends to operate a serving cell in time division duplex (TDD) mode, the BS may configure a pattern for UL and DL allocation for the serving cell through higher layer (e.g., RRC) signaling. For example, the following parameters may be used to configure a TDD DL-UL pattern:

dl-UL-TransmissionPeriodicity that provides a periodicity of the DL-UL pattern;

nrofDownlinkSlots that provides the number of consecutive full DL slots at the beginning of each DL-UL pattern, where the full DL slots are slots having only DL symbols;

nrofDownlinkSymbols that provides the number of consecutive DL symbols at the beginning of a slot immediately following the last full DL slot;

nrofUplinkSlots that provides the number of consecutive full UL slots at the end of each DL-UL pattern, where the full UL slots are slots having only UL symbols; and nrofUplinkSymbols that provides the number of consecutive UL symbols in the end of a slot immediately preceding the first full UL slot.

The remaining symbols that are not configured as either DL symbols or UL symbols among symbols in the DL-UL pattern are flexible symbols.

If the UE is provided with a configuration for the TDD DL-UL pattern, i.e., a TDD UL-DL configuration (e.g., tdd-UL-DL-ConfigurationCommon, or tdd-UL-DLConfigurationDedicated), through higher layer signaling, the UE sets a slot format per slot over a number of slots based on the configuration.

For symbols, although there may be various combinations of DL symbols, UL symbols, and flexible symbols, a predetermined number of combinations may be predefined as slot formats and the predefined slot formats may be respectively identified by slot format indexes. The following table shows a part of the predefined slot formats. In the table below, D denotes a DL symbol, U denotes a UL symbol, and F denotes a flexible symbol.

TABLE 3

| Format | \multicolumn{14}{c}{Symbol number in a slot} | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... |  |  |  |  |  |  | ... |  |  |  |  |  |  |  |

To indicate which slot format is used in a specific slot among the predefined slot formats, the BS may configure a set of slot format combinations applicable to a corresponding serving cell per cell with respect to a set of serving cells through higher layer (e.g., RRC) signaling and cause the UE to monitor a group-common PDCCH for slot format indicator(s) (SFI(s)) through higher layer (e.g., RRC) signaling. Hereinafter, DCI carried by the group-common PDCCH for the SFI(s) will be referred to as SFI DCI. DCI format 2_0 is used as the SFI DCI. For example, for each serving cell in a set of serving cells, the BS may provide the UE with the (start) position of a slot format combination ID (i.e., SFI-index) for a corresponding serving cell in the SFI DCI, a set of slot format combinations applicable to the serving cell, and a reference subcarrier spacing configuration for each slot format in a slot format combination indicated by an SFI-index value in the SFI DCI. One or more slot formats are configured for each slot format combination in the set of the slot format combinations and the slot format combination ID (i.e., SFI-index) is assigned to the slot format combination. For example, when the BS intends to configure the slot format combination with N slot formats, N slot format indexes among slot format indexes for the predefined slot formats (e.g., see Table 3) may be indicated for the slot format combination. In order to configure the UE to monitor the group-common PDCCH for the SFIs, the BS informs the UE of an SFI-RNTI corresponding to an RNTI used for an SFI and the total length of a DCI payload scrambled with the SFI-RNTI. Upon detecting the PDCCH based on the SFI-RNTI, the UE may determine slot format(s) for the corresponding serving cell from an SFI-index for the serving cell among SFI-indexes in the DCI payload in the PDCCH.

Symbols indicated as flexible symbols by the TDD DL-UL pattern configuration may be indicated as UL symbols, DL symbols, or flexible symbols by the SFI DCI. Symbols indicated as the DL/UL symbols by the TDD DL-UL pattern configuration are not overridden as the UL/DL symbols or the flexible symbols by the SFI DCI.

If the TDD DL-UL pattern is not configured, the UE determines whether each slot is used for UL or DL and determines symbol allocation in each slot based on the SFI DCI and/or on DCI for scheduling or triggering DL or UL signal transmission (e.g., DCI format 1_0, DCI format 1_1, DCI format 1_2, DCI format 0_0, DCI format 0_1, DCI format 0_2, or DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including information about resource allocation of the DL-SCH is referred to as PDSCH scheduling DCI, and DCI including information about resource allocation of the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (LI). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 5.

(0) PUCCH Format 0 (PF0 or F0)
  Supported UCI payload size: up to K bits (e.g., K=2)
  Number of OFDM symbols constituting a single PUCCH: 1 to X symbols (e.g., X=2)
  Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
  Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)
  Supported UCI payload size: up to K bits (e.g., K=2)
  Number of OFDM symbols constituting a single PUCCH: Y to Z symbols (e.g., Y=4 and Z=14)
  Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
  Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)
  Supported UCI payload size: more than K bits (e.g., K=2)
  Number of OFDM symbols constituting a single PUCCH: 1 to X symbols (e.g., X=2)
  Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.
  Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)
  Supported UCI payload size: more than K bits (e.g., K=2)
  Number of OFDM symbols constituting a single PUCCH: Y to Z symbols (e.g., Y=4 and Z=14)
  Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).
  Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)
  Supported UCI payload size: more than K bits (e.g., K=2)
  Number of OFDM symbols constituting a single PUCCH: Y to Z symbols (e.g., Y=4 and Z=14)
  Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM)) mapping) to the DMRS. In other words, modulation symbols of the UCI are subjected to TDM with the DMRS, for transmission.
  Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 5

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$. —PUCCH resource set #0, if the number of UCI bits=<2
  PUCCH resource set #1, if 2<the number of UCI bits=<$N_1$
  . . .
  PUCCH resource set #(K−1), if $N_{K-2}$<the number of UCI bits=<$N_{K-1}$ Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 6).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.
Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
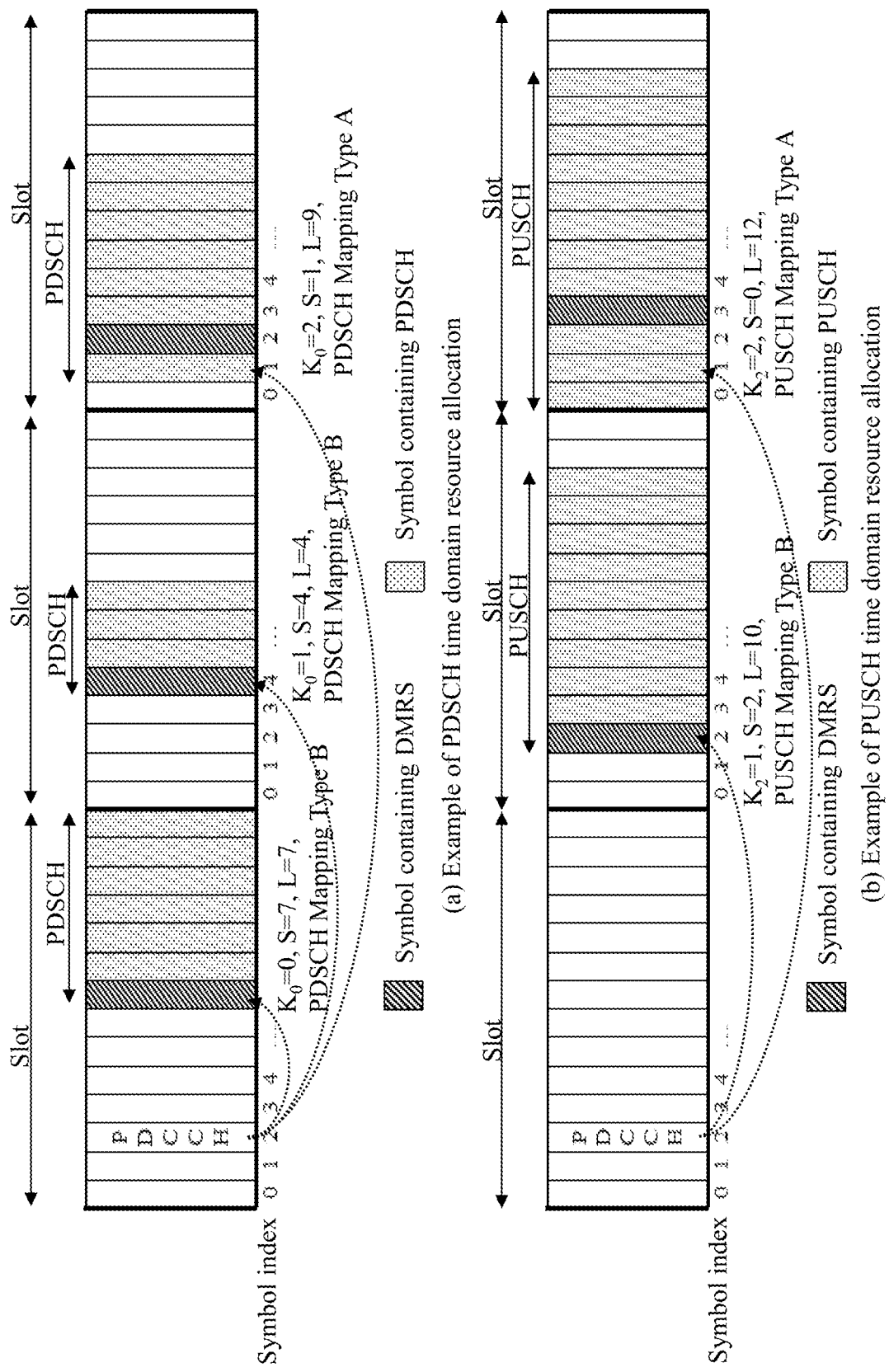
FIG. 7 illustrates an example of PDSCH time domain resource assignment (TDRA) caused by a PDCCH and an example of PUSCH TDRA caused by the PDCCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator SLIV (or directly, a start position (e.g., start symbol index 5) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index 5) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type has two mapping types: mapping type A and mapping type B. In PDSCH/PUSCH mapping type A, a demodulation reference signal (DMRS) is mapped to a PDSCH/PUSCH resource based on the start of a slot. According to other DMRS parameters, one or two symbols among the symbols of the PDSCH/PUSCH resource may be used as DMRS symbol(s). For example, in PDSCH/PUSCH mapping type A, the DMRS is located on the third symbol (symbol #2) or the fourth symbol (symbol #3) in the slot according to RRC signaling. In PDSCH/PUSCH mapping type B, the DMRS is mapped based on the first OFDM symbol of the PDSCH/PUSCH resource. According to other DMRS parameters, one or two symbols from the first symbol of the PDSCH/PUSCH resource may be used as DMRS symbol(s). For example, in PDSCH/PUSCH mapping type B, the DMRS is located on the first symbol allocated for PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;
periodicity corresponding to a periodicity of configured grant Type 1;

timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIT) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+ N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPerSlot)+ (slot number in the frame*numberOfSymbolsPerSlot)+symbol number in the slot]=[(SFN$_{start\ time}$ *numberOfSlotsPerFrame*numberOfSymbolsPerSlot+ slot$_{start\ time}$ *numberOfSymbolsPerSlot+symbol$_{start\ time}$)+ N*periodicity] modulo (1024*numberOfSlotsPerFrame*numberOfSymbolsPerSlot), for all N>=0, where SFN$_{start\ time}$, slot$_{start}$ time, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+ slot$_{start}$ time)+N*periodicity*numberOfSlotsPerFrame/10] modulo (1024*numberOfSlotsPerFrame), where SFN$_{start\ time}$ and Slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and the number of consecutive OFDM symbols per slot, respectively (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 7 and Table 8. Table 7 shows an example of special fields for DL SPS and UL grant Type 2 scheduling activation PDCCH validation, and Table 8 shows an example of special fields for DL SPS and UL grant Type 2 scheduling release PDCCH validation.

TABLE 6

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 7

| | DCI format 0_0 | DCI format 1_0 |
|---|---|---|
| HARQ process number | set to all '0's | set to all '0's |
| Redundancy version | set to '00's | set to '00's |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

Figure 8:
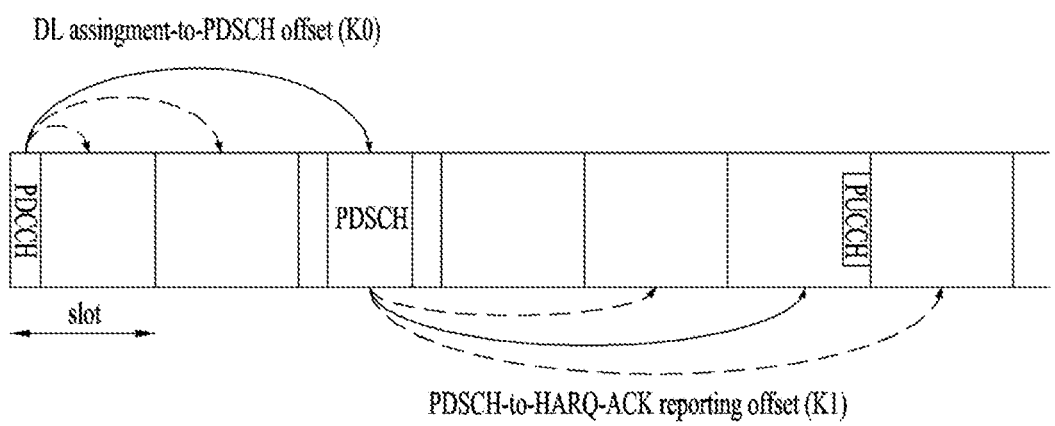
FIG. 8 illustrates a hybrid automatic repeat request-acknowledgement (HARQ-ACK) transmission/reception procedure.

FIG. 8 illustrates a HARQ-ACK transmission/reception procedure.

Referring to FIG. 8, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ feedback timing indicator: This indicator indicates K1.

If the PDSCH is configured to transmit a maximum of one TB, a HARQ-ACK response may consist of one bit. If the PDSCH is configured to transmit a maximum of 2 TB s, the HARQ-ACK response may consist of 2 bits when spatial bundling is not configured and one bit when spatial bundling is configured. When a HARQ-ACK transmission timing for a plurality of PDSCHs is designated as slot n+K1, UCI transmitted in slot n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme.

In the case of the semi-static HARQ-ACK codebook, parameters related to a HARQ-ACK payload size that the UE is to report are semi-statically determined by a (UE-specific) higher layer (e.g., RRC) signal. The HARQ-ACK payload size of the semi-static HARQ-ACK codebook, e.g., the (maximum) HARQ-ACK payload (size) transmitted through one PUCCH in one slot, may be determined based on the number of HARQ-ACK bits corresponding to a combination (hereinafter, bundling window) of all DL carriers (i.e., DL serving cells) configured for the UE and all DL scheduling slots (or PDSCH transmission slots or PDCCH monitoring slots) for which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, the HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n-k). For example, when k∈{1, 2, 3, 4, 5, 6, 7, 8}, the HARQ-ACK information of slot #n may include HARQ-ACK corresponding to slot #(n-8) to slot #(n-1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on the PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In the dynamic HARQ-ACK codebook scheme, DL scheduling DCI may include a counter-DAI (i.e., c-DAI) and/or a total-DAI (i.e., t-DAI). Here, the DAI indicates a downlink assignment index and is used for the BS to inform the UE of transmitted or scheduled PDSCH(s) for which HARQ-ACK(s) are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides parameters (e.g., CORESET #0 configuration) for monitoring a PDCCH for scheduling a PDSCH carrying system information block 1 (SIB1) to the UE. The PBCH may also indicate that there is no associated SIB1. In this case, the UE may be provided with not only a frequency range in which the UE may assume that there is no SSB associated with SSB1 but also other frequencies to search for an SSB associated with SIB1. CORESET #0, which is a CORESET for scheduling SIB1 at least, may be configured by the MIB or dedicated RRC signaling.

A set of PDCCH candidates monitored by the UE is defined in terms of PDCCH search space sets. The search space set may be a common search space (CSS) set or a UE-specific search space (USS) set. Each CORESET configuration is associated with one or more search space sets, and each search space set is associated with one CORESET configuration. The search space set is determined based on the following parameters provided by the BS to the UE.

controlResourceSetk1: an identifier for identifying a CORESET p associated with a search space set s.

monitoringSlotPeriodicityAndOffset: a PDCCH monitoring periodicity of slots $k_s$ and a PDCCH monitoring offset of $o_s$ slots to configure slots for PDCCH monitoring.

duration: a duration of $T_s<k_s$ slots indicating a number of slots in which the search space set s exists.

monitoringSymbolsWithinSlot: a PDCCH monitoring pattern within a slot, indicating first symbol(s) of the CORESET within a slot for PDCCH monitoring.

nrofCandidates: a number of PDCCH candidates per CCE aggregation level.

searchSpaceType: an indication that search space set s is either a CCE set or a USS set.

The parameter monitoringSymbolsWithinSlot may indicate the first symbol(s) for PDCCH monitoring in the slots configured for PDCCH monitoring (e.g., see monitoringSlotPeriodicityAndOffset and duration). For example, when monitoringSymbolsWithinSlot is a 14-bit parameter, the most significant (leftmost) bit may represent the first OFDM symbol in the slot, and the second most significant (leftmost) bit may represent the second OFDM symbol in the slot. In this way, the bits of monitoringSymbolsWithinSlot may represent the 14 OFDM symbols of the slot, respectively. For example, bit(s) set to 1 among the bits in monitoringSymbolsWithinSlot may identify the first symbol(s) of the CORESET in the slot.

A UE monitors PDCCH candidates in PDCCH monitoring occasions only. The UE determines a monitoring occasion on an active DL BWP from the PDCCH monitoring periodicity, the PDCCH monitoring offset, and the PDCCH monitoring pattern within a slot. In some implementations, for search space set s, the UE determines that a PDCCH monitoring occasion(s) existing in a slot with number $n^u_{s,f}$ in a frame with number of if $(n_f * N^{frame,u}_{slot} + n^u_{s,f} - o_s)$ mod $k_s = 0$. The UE monitors PDCCH candidates for search space set s for $T_s$ consecutive slots, starting from slot $n^u_{s,f}$, and does not monitor PDCCH candidates for search space set s for the next $k_s - T_s$.

The following table shows search space sets, related RNTIs, and use cases thereof

TABLE 8

| Search Space Set | RNTI | Use Case |
| --- | --- | --- |
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

The following table shows DCI formats carried by a PDCCH.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |

TABLE 9-continued

| DCI format | Usage |
| --- | --- |
| 2_3 | Transmission of a group of TPC commands for SRS transmissions by one or more UEs |
| 2_4 | Notifying a group of UEs of PRB(s) and OFDM symbol(s) where UE cancels the corresponding UL transmission from the UE |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. For a CSS, DCI format 0_0 and DCI format 1_0 have fixed sizes after the BWP size is initially given by RRC. For a USS, DCI format 0_0 and DCI format 1_0 are fixed in size in fields other than a frequency domain resource assignment (FDRA) field, and the FDRA field may vary in size by configuration of a related parameter by the BS. In DCI format 0_1 and DCI format 1_1, the size of the DCI field may be changed by various RRC reconfigurations by the BS. DCI format 2_0 may be used to transfer dynamic slot format information (e.g., SFI DCI) to the UE, and DCI format 2_1 may be used to transfer downlink pre-emption information to the UE. DCI format 2_4 may be used to indicate a UL resource for which UL transmission from the UE should be canceled.

For example, each of DCI format 0_0 and DCI format 0_1 may include an FDRA field for scheduling a PUSCH, and each of DCI format 1_0 and DCI format 1_1 may include an FDRA field for scheduling a PDSCH. The number of bits in the FDRA field of each of DCI format 0_0 and DCI format 0_1 may be determined based on $N_{RB}^{UL,BWP}$, which is the size of an active or initial UL BWP. The number of bits in the FDRA field of each of DCI format 1_0 and DCI format 1_1 may be determined based on $N_{RB}^{DL,BWP}$, which is the size of an active or initial DL BWP.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a short scheduling time unit and a reliable transmission method.

A reference time unit assumed/used to transmit/receive a physical channel may vary among application fields or types of traffic. The reference time may be a basic unit for scheduling a specific physical channel, and the reference time unit may depend on the number of symbols and/or subcarrier spacing, and the like constituting the corresponding scheduling time unit. For simplicity, some embodiments/implementations of the present disclosure are described based on a slot or mini-slot as a reference time unit. A slot may be, for example, a basic unit for scheduling used for general data traffic (e.g., eMBB). A mini-slot may have a smaller time period than a slot in the time domain, and may be a basic unit for scheduling used in a special purpose or in a special communication scheme (e.g., URLLC, or unlicensed band or millimeter wave, etc.). However, embodiment(s)/implementation(s) of the present disclosure may be applied even in transmitting/receiving a physical channel based on the mini-slot for the eMBB service or transmitting/receiving a physical channel based on the slot for URLLC or other communication techniques.

For a service having strict latency and reliability requirements (e.g., URLLC service), the reliability of PUSCH/PDSCH transmission may need to be higher than that of the existing PUSCH/PDSCH transmission. In order to improve the reliability of PUSCH/PDSCH transmission, repeated transmission of PUSCH/PDSCH may be considered.

Figure 9:
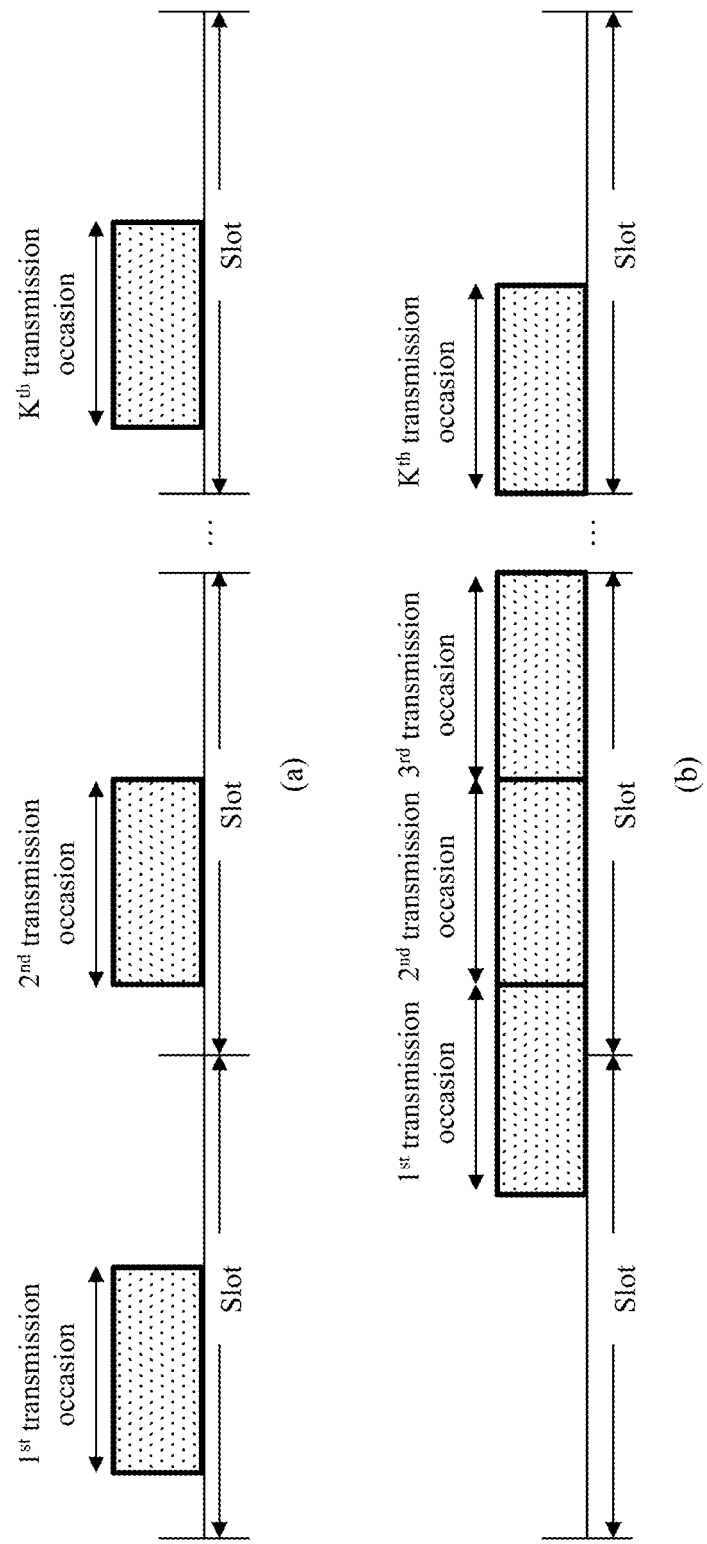
FIG. 9 illustrates types of repetitive transmissions.

FIG. 9 illustrates types of repeated transmissions. Two types of repeated transmissions may be scheduled. In some implementations of the present disclosure, repetition of PUSCH/PDSCH may be applied to PUSCH/PDSCH transmission based on dynamic UL grant/DL assignment on PDCCH. The repetition of PUSCH/PDSCH may also be applied to transmission of PUSCH/PDSCH based on a configured grant. Repetitions to be applied to the PUSCH/PDSCH transmission may be indicated to or configured for the UE by the BS. For example, the UE may receive an indication of a repetition factor K through L1 signaling or a configuration thereof through higher layer signaling from the BS. Once the repetition factor K used to indicate the repetition number of the repeated transmission, or the like is indicated to or configured for the UE, the UE may repeat transmission/reception of a TB across K transmission/reception occasions. In the present disclosure, the repetition factor is also referred to as a repeated transmission factor.

The UE may be configured to perform multi-slot PUSCH transmission or multi-slot PDSCH reception. For example, referring to FIG. 9(a), the UE may be configured by the BS to apply the same symbol(s) allocation across K consecutive slots, where K is an integer greater than 1. In this case, the UE repeats transmission/reception of a TB across the K consecutive slots by applying the same slot(s) allocation in each of the K consecutive slots. In the present disclosure, an occasion on which a TB may be transmitted/received may be referred to as a transmission occasion/reception occasion. For example, when K PDSCH/PUSCH repetitions are indicated to the UE for the serving cell, the UE may perform PDSCH reception/PUSCH transmission in K consecutive DL slot(s)/subslot(s), starting in slot/subslot n. In this case, the UE may assume that all K PDSCH receptions/transmissions are performed in the same RB(s).

When the symbols of a slot allocated for PUSCH/PDSCH via a TDD UL-DL configuration by higher layer signaling and/or via SFI DCI are determined as downlink/uplink symbols, the UE omits transmission/reception in the slot for multi-slot PUSCH/PDSCH transmission/reception.

Hereinafter, PUSCH/PDSCH repetition performed by applying the same resource allocation across multiple consecutive slots is referred to as PUSCH/PDSCH repetition type A. In PUSCH/PDSCH repetition type A, when the UE receives resource allocation for wireless transmission from the BS, it may repeatedly use time-frequency resources defined in one slot on a slot-by-slot basis.

However, to cause the UE to perform PUSCH/PDSCH transmission/reception across multiple consecutive slots using the same resource allocation, the BS needs to secure the multiple consecutive slots. This may make flexible resource allocation difficult. In addition, when the BS intends to perform PDCCH transmission and PUSCH/PDSCH transmission in one slot to secure latency, repetition of PUSCH/PDSCH for securing reliability may cause a large latency because only a few symbols of the latter half of the slot will be available as PUSCH/PDSCH transmission occasions. In the case of PUSCH/PDSCH transmission based on a configured grant, resource allocation for a TB may always be determined within one period of the configured grant. For example, a time duration for transmission of K repetitions for one TB may not exceed a time duration induced by the periodicity P of the configured grant. In some embodiments/implementations of the present disclosure, the UE transmits/receives PUSCH/PDSCH according to a redundancy version (RV) sequence only at a predetermined position among a plurality of PUSCH/PDSCH resources for PUSCH/PDSCH repetition. For example, in some embodiments/implementations, when the configured RV sequence is 10, 2, 3, 11, the UE starts the initial transmission of the TB on the first transmission occasion among K transmission occasions for K repetitions. In this case, a long time may need to be secured to secure the reliability of PUSCH/PDSCH transmission, or it may be difficult to configure a short periodicity using a plurality of PUSCH resources. In particular, when TB transmission is started in the middle of a plurality of PUSCH/PDSCH resources within a periodicity of the configured grant, that is, on an intermediate transmission occasion among the transmission occasions, it may be difficult to perform the repetition a sufficient number of times. Therefore, in the next radio access technology, it is being discussed to enable more flexible scheduling for URLLC by configuring resources regardless of slot boundaries or by repeatedly using resources on a symbol-by-symbol basis. For example, for more flexible and efficient resource utilization and service support and for faster and more robust UL/DL channel transmission, PUSCH/PDSCH may need to be repeated at an interval shorter than a slot, or resources for PUSCH/PDSCH repetition may need to be allocated regardless of the slot boundary, as illustrated in FIG. 9(b).

Referring to FIG. 9(b), the UE may be instructed or configured by the BS to perform PUSCH/PDSCH repetition back to back. Hereinafter, PUSCH/PDSCH repetition in which radio resources for PUSCH/PDSCH repetition are concatenated back to back in the time domain will be referred to as PUSCH/PDSCH repetition type B.

FIG. 10 illustrates a wireless communication system supporting an unlicensed band applicable to some implementations of the present disclosure. For example, FIG. 10 may include an NR unlicensed spectrum (NR-U) based wireless communication system.

Hereinafter, a cell operating in a licensed band (hereinafter, L-band) is referred to as an LCell, and a carrier of the LCell is referred to as a (DL/UL) LCC. Also, a cell operating in an unlicensed band (hereinafter, U-band) is referred to as a UCell, and a carrier of the UCell is referred to as a (DL/UL) UCC. The carrier or carrier frequency of the cell may represent an operating frequency (e.g., center frequency) of the cell. Hereinafter, a cell and a carrier (e.g., CC) may be collectively referred to as a cell.

In some scenarios, when the UE and the BS transmit/receive a signal through a carrier aggregated LCC and UCC as shown in FIG. 10(a), the LCC may be configured as a primary CC (PCC) and the UCC may be configured as secondary CC (SCC). In some scenarios, as shown in FIG. 10(b), the UE and the BS may transmit/receive a signal through one UCC or a plurality of carrier-aggregated UCCs. That is, in some scenarios, the UE and the BS may transmit/receive a signal through only UCC(s) without the LCC.

Hereinafter, in some scenarios of the present disclosure, a signal transmission/reception operation in a U-band may be performed based on all the deployment scenarios described above (unless otherwise stated).

Unless otherwise stated, the definitions below may be applied to terms used in the present disclosure.

Channel: Consists of contiguous resource blocks (RBs) in which a channel access procedure is performed on a shared spectrum, and may refer to a carrier or a part of a carrier.

Channel access procedure (CAP): Represents a procedure of evaluating channel availability based on sensing in order for a transmission device to determine whether the channel is being used by another communication node(s) before signal transmission. A basic unit for sensing is a sensing slot of a duration Tsl=9 us. When the BS or UE senses the channel for the sensing slot duration, and the power detected for, for example, at least 4 us within the sensing slot duration is less than an energy detection threshold XThresh, the sensing slot duration Tsl may be considered to be in an idle state. Otherwise, for example, the sensing slot duration Tsl=9 us may be considered to be a busy state. The CAP may be referred to as Listen-Before-Talk (LBT).

Channel occupancy: Refers to transmission(s) by the BS/UE on the channel(s) after the channel access procedure.

Channel occupancy time (COT): May refer to the total time for which the BS/UE and any BS/UE(s) sharing the channel occupancy may perform transmission(s) on the channel after the channel access procedure. In determining the COT, when the transmission gap is 25 us or less, the gap period may also be counted in the COT. The COT may be shared for transmission between the BS and the corresponding UE(s).

DL transmission burst: Defined as a set of transmissions from the BS, with no gaps exceeding 16 us. Transmissions from the BS, separated by a gap exceeding 16 us, may be considered as separate DL transmission bursts. The BS may perform transmission(s) after the gap without sensing channel availability within the DL transmission burst.

UL transmission burst: Defined as a set of transmissions from the UE, with no gaps exceeding 16 us. Transmissions from the UE, separated by a gap exceeding 16 us, may be considered as separate UL transmission bursts. The UE may perform transmission(s) after the gap without sensing channel availability within the UL transmission burst.

Discovery burst: Refers to a DL transmission burst including a set of signal(s) and/or channel(s), defined within a (time) window and associated with a duty cycle. In an LTE-based system, the discovery burst may include a PSS, an SSS, and a cell-specific RS (CRS) as transmission(s) initiated by the BS, and may further include a non-zero power CSI-RS. In an NR-based system, the discovery burst may include at least an SS/PBCH block as the transmission(s) initiated by the BS, and may further include a CORESET for a PDCCH scheduling a PDSCH having SIB1, a PDSCH carrying SIB1, and/or a non-zero power CSI-RS.

Figure 11:
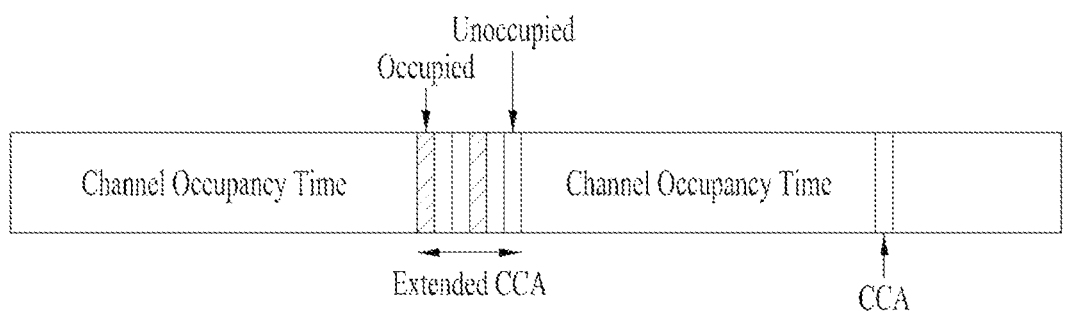
FIG. 11 illustrates a method of occupying a resource in an unlicensed band.

FIG. 11 illustrates a method of occupying a resource in an unlicensed band.

Referring to FIG. 11, a communication node (e.g., BS, UE) in a U-band should determine whether a channel is used by other communication node(s) before signal transmission. To this end, the communication node in the U-band may perform the CAP to access the channel(s) on which transmission(s) is performed. The CAP may be performed based on sensing. For example, the communication node may first perform carrier sensing (CS) before transmitting a signal to determine whether other communication node(s) are transmitting a signal. For example, the communication node may apply Listen-Before-Talk (LBT) before performing transmission in the cell to which a shared spectrum channel is connected. When the LBT is applied, the transmission device listens to/senses a channel to determine whether the channel is free or busy, and performs transmission only when the channel is sensed to be free. When it is determined that other communication node(s) are not transmitting a signal, for example, when the channel is sensed to be free, it is defined that clear channel assessment (CCA) is confirmed. When there is a CCA threshold (e.g., XThresh) that is pre-defined or configured by a higher layer (e.g., RRC), the communication node may determine that the channel is busy when energy higher than the CCA threshold is detected on the channel. Otherwise, it may determine that the channel is idle. When it is determined that the channel is idle, the communication node may start signal transmission in the U-band. In the present disclosure, the term CAP may be replaced with LBT, LBT CAP, or LBT/CAP.

In some implementations of the present disclosure, the frame type 3 of LTE or the NR frame structure (see FIG. 5) may be used for operation in the U-band. The configuration of OFDM symbols occupied for uplink/downlink signal transmission in the frame structure for the U-band may be provided by the BS. Here, the OFDM symbol may be replaced with an SC-FDM(A) symbol. In some implementations of the present disclosure, for downlink signal transmission through the U-band, the BS may inform the UE of the configuration of OFDM symbols used in subframe #n by signaling. Here, the terms subframe may be replaced by a slot or a time unit (TU). For example, in an LTE system supporting the U-band, the UE may assume (or identify) the configuration of an occupied OFDM symbol in subframe #n based on a specific field (e.g., a subframe configuration for LAA field, etc.) in the DCI received from the BS in subframe #n−1 or subframe #n.

In some implementations of the present disclosure, for uplink signal transmission through the U-band, the BS may provide information about an uplink transmission duration to the UE through signaling. For example, in an LTE system supporting the U-band, the UE may acquire the information of "UL duration" and "UL offset" for subframe #n through a "UL duration and offset" field in the detected DCI. For example, when the "UL duration and offset" field sets (or indicates) UL offset 1 and UL duration d for subframe #n, the UE may not need to receive a downlink physical channel and/or a physical signal in subframe #n+1+i (where i=0, . . . , d−1).

Figure 12:
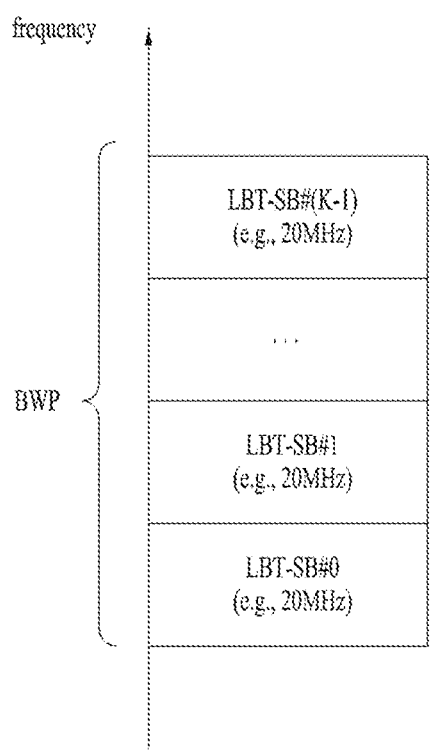
FIG. 12 illustrates a bandwidth part (BWP) including a plurality of LBT-SBs in an unlicensed band.

FIG. 12 illustrates a bandwidth part (BWP) including a plurality of LBT-SBs in an unlicensed band.

A cell (or carrier (e.g., CC)) or BWP configured for the UE in a wireless communication system supporting the U-band may be configured with a wideband having a larger bandwidth (BW) than that of conventional LTE, However, the BW requiring CCA based on the independent LBT operation may be limited based on regulation, etc. When a subband (SB) in which individual LBT is performed is referred to as an LBT-SB, a plurality of LBT-SBs may be included in a wideband cell/BWP. In some implementations of the present disclosure, an RB set constituting an LBT-SB may be configured through higher layer (e.g., RRC) signaling. Accordingly, based on (i) the BW of a cell/BWP and (ii) the RB set allocation information, one or more LBT-SBs may be included in a cell/BWP.

Referring to FIG. 12, a plurality of LBT-SBs may be included in the BWP of a cell (or carrier). An LBT-SB may have, for example, a 20 MHz band. The LBT-SB may be composed of a plurality of contiguous (P)RBs in the frequency domain, and may be referred to as a (P)RB set. Although not shown, a guard band (GB) may be included between the LBT-SBs. For example, referring to FIG. 12, the BWP may be configured in the form of {LBT-SB #0 (RB set #0)+GB #0+LBT-SB #1 (RB set #1+GB #1)+ . . . +LBT-SB #(K−1) (RB set (#K−1))}. The LBT-SB/RB index may be configured/defined to start from a low frequency band and increase toward a high frequency band.

In some implementations of the present disclosure, the BS may perform one of the following CAPs for downlink signal transmission in the U-band.

(1) Type 1 Downlink (DL) CAP

In Type 1 DL CAP, the length of the time duration spanned by the sensing slot that is sensed to be idle before transmission(s) is random. Type 1 DL CAP may be applied to the following transmission:

Transmission(s) initiated by BS, including (i) a unicast PDSCH with user plane data, or (ii) a unicast PDSCH with user plane data and a unicast PDCCH for scheduling the user plane data; or Transmission(s) initiated by the BS and having either (i) a discovery burst only or (ii) a discovery burst multiplexed with non-unicast information.

Figure 13:
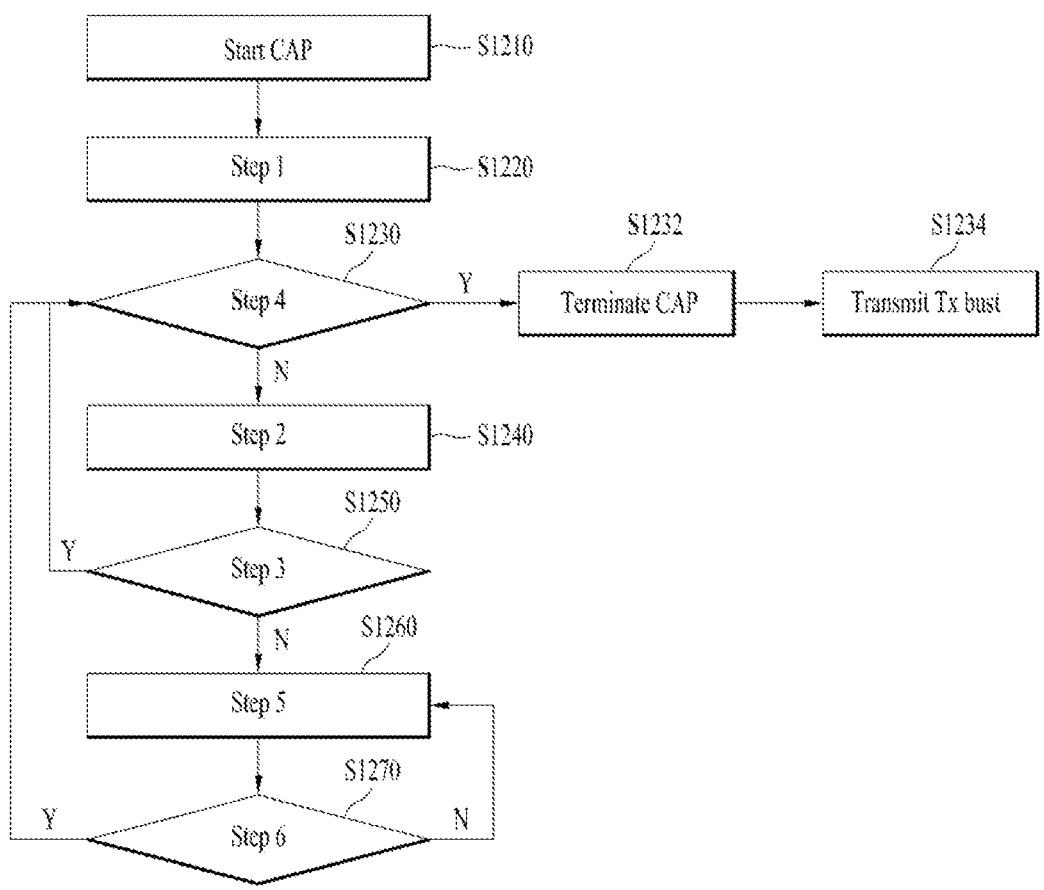
FIG. 13 illustrates a flow of a CAP operation of a BS for downlink signal transmission by the BS through an unlicensed band.

FIG. 13 illustrates a flow of a CAP operation of a BS for downlink signal transmission by the BS through an unlicensed band.

Referring to FIG. 13, the BS may first sense whether the channel is idle for the sensing slot duration of a defer duration $T_d$, and may then perform transmission when the counter N reaches 0 (S1234). Here, the counter N is adjusted by sensing the channel for additional sensing slot duration(s) according to the following procedure:

Step 1) Set N=$N_{init}$ (S1220), where $N_{init}$ is a random value uniformly distributed between 0 and $CW_p$. Then, go to step 4;

Step 2) When N>0 and the BS chooses to decrement the counter, set N=N−1 (S1240);

Step 3) Sense the channel for the additional sensing slot duration. If the additional sensing slot duration is idle (Y in S1250), go to step 4. Otherwise (N in S1250), go to step 5;

Step 4) If N=0 (Y in S1230), terminate the CAP (S1232). Otherwise (N in S1230), go to step 2;

Step 5) Sense the channel until a busy sensing slot is detected within the additional defer duration $T_d$ or all sensing slots within the additional defer duration $T_d$ are detected to be idle (S1260); and Step 6) If the channel is sensed to be idle for all the sensing slot durations of the additional defer duration $T_d$ (Y in S1270), go to step 4. Otherwise (N in S1270), go to step 5.

The following table shows that $m_p$, the minimum contention window (CW), the maximum CW, the maximum channel occupancy time (MCOT), and the allowed CW sizes applied to the DL CAP vary according to a channel access priority class.

TABLE 10

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The defer duration $T_d$ is configured in the form of duration $T_f$ (16 us)+$m_p$ consecutive sensing slot durations $T_{sl}$ (9 us). $T_f$ includes the sensing slot duration $T_{sl}$ at the start of the 16 us duration.

$CW_{min,p}<=CW_p<=CW_{max,p}$. $CW_p$ may be configured as $CW_p=CW_{min,p}$, and may be updated before step 1 based on HARQ-ACK feedback (e.g., the ratio of ACK or NACK) to the previous DL burst (e.g., PDSCH) (CW size update). For example, $CW_p$ may be initialized to $CW_{min,p}$ based on the HARQ-ACK feedback to the previous DL burst, may be increased to the next high allowed value, or maintain the existing value.

(2) Type 2 DL CAP

In Type 2 DL CAP, the length of the time duration spanned by the sensing slot that is sensed to be idle before transmission(s) is deterministic. Type 2 DL CAP is classified into Type 2A/2B/2C DL CAPs.

Type 2A DL CAP may be applied to the following transmission. In Type 2A DL CAP, the BS may perform transmission immediately after the channel is sensed to be idle for at least the sensing duration $T_{short\_dl}$=25 us. Here, $T_{short\_dl}$ is composed of a duration $T_f$ (=16 us) immediately followed by one sensing slot duration. $T_f$ includes a sensing slot at the start of the duration.

Transmission(s) initiated by the BS and having either (i) a discovery burst only or (ii) a discovery burst multiplexed with non-unicast information; or Transmission(s) of the BS after a 25 us gap from transmission(s) by UE within shared channel occupancy.

Type 2B DL CAP is applicable to transmission(s) performed by the BS after a 16 us gap from the transmission(s) by the UE within the shared channel occupancy time. In Type 2B DL CAP, the BS may perform transmission immediately after the channel is sensed to be idle for $T_f$=16 us. $T_f$ includes a sensing slot within the last 9 us of the duration. Type 2C DL CAP is applicable to transmission(s) performed by the BS after a gap of up to 16 us from the transmission(s) by the UE within the shared channel occupancy time. In Type 2C DL CAP, the BS does not sense the channel before performing transmission.

(3) Third Downlink CAP

The BS may perform the following CAP for DL signal transmission through multiple carriers in the U-band.

1) Type A: The BS performs the CAP on multiple carriers based on a counter N defined for each carrier (counter N considered in the CAP), and performs DL signal transmission based thereon.
- Type A1: The counter N for each carrier is determined independently, and DL signal transmission through each carrier is performed based on the counter N for each carrier.
- Type A2: The counter N for each carrier is determined as a value of N for a carrier having the largest CW size, and DL signal transmission through the carrier is performed based on the counter N for each carrier.

2) Type B: The BS performs the CAP based on the counter N only for a specific carrier among a plurality of carriers, and determines whether the channel is idle for the remaining carriers prior to signal transmission on the specific carrier to perform DL signal transmission.
- Type B1: A single CW size is defined for a plurality of carriers, and the BS utilizes the single CW size in performing the CAP based on the counter N for a specific carrier.
- Type B2: A CW size is defined for each carrier, and the largest CW size among the CW sizes is utilized in determining the value $N_{init}$ for a specific carrier.

In some implementations of the present disclosure, the UE may perform Type 1 or Type 2 CAP for UL signal transmission in the U-band. In general, the UE may perform a CAP (e.g., type 1 or type 2) configured by the BS for UL signal transmission. For example, the UE may include CAP type indication information in a UL grant (e.g., DCI format 0_0, 0_1, or 0_2) for scheduling PUSCH transmission.

(1) Type 1 UL CAP

In Type 1 UL CAP, the length of the time duration spanned by the sensing slot that is sensed to be idle before transmission(s) is random. Type 1 UL CAP may be applied to the following transmission:
- PUSCH/SRS transmission(s) scheduled and/or configured by the BS;
- PUCCH transmission(s) scheduled and/or configured by the BS; or
- Transmission(s) related to a random access procedure.

Figure 14:
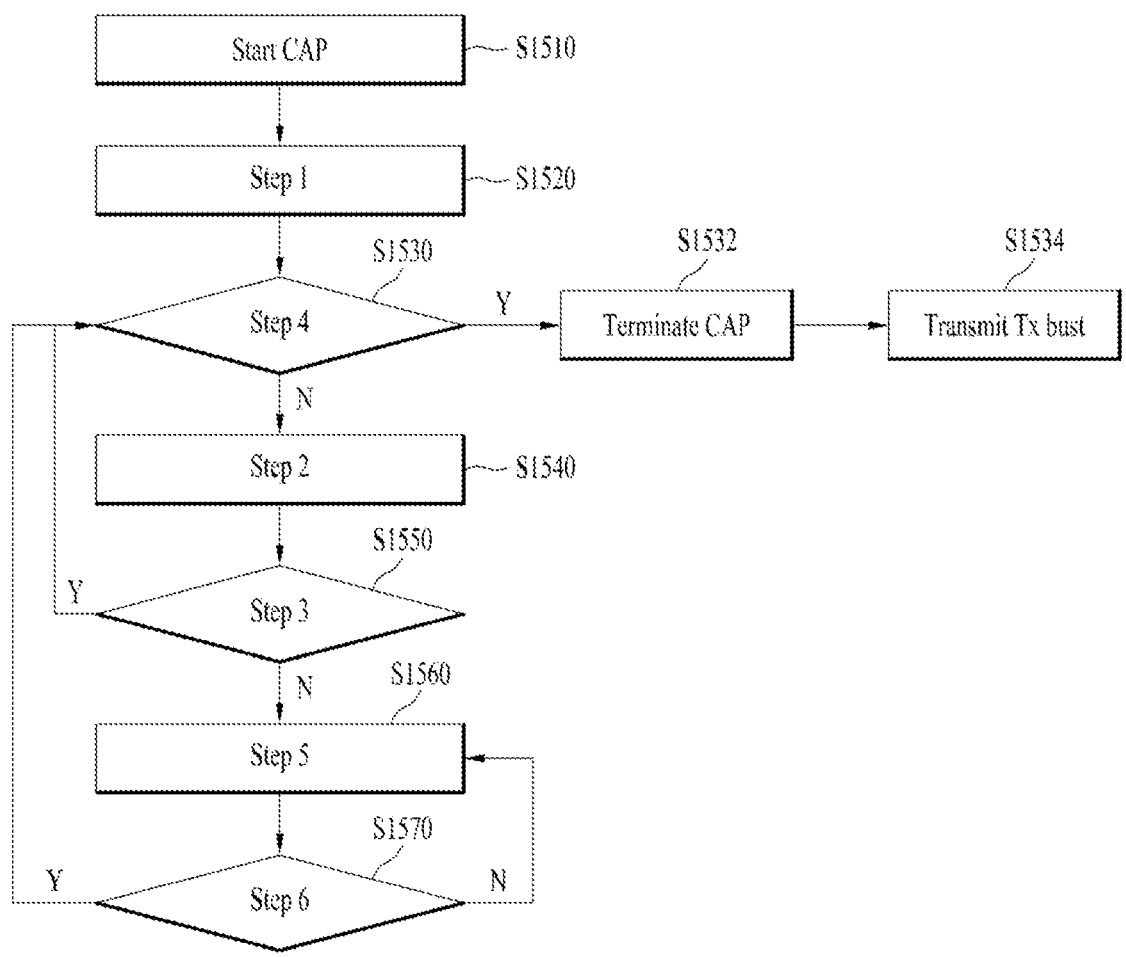
FIG. 14 illustrates a flow of a Type 1 CAP operation of a UE for uplink signal transmission.

FIG. 14 illustrates a flow of a Type 1 CAP operation of a UE for uplink signal transmission.

Referring to FIG. 14, the UE may first sense whether the channel is idle for the sensing slot duration of a defer duration I'd, and may then perform transmission when the counter N reaches 0 (S1534). Here, the counter N is adjusted by sensing the channel for additional sensing slot duration(s) according to the following procedure:

Step 1) Set $N=N_{init}$ (S1520), where $N_{init}$ is a random value uniformly distributed between 0 and $CW_p$. Then, go to step 4;

Step 2) When N>0 and the UE chooses to decrement the counter, set N=N−1 (S1540);

Step 3) Sense the channel for the additional sensing slot duration (S1550). If the additional sensing slot duration is idle (Y in S1550), go to step 4. Otherwise (N in S1550), go to step 5;

Step 4) If N=0 (Y in S1530), terminate the CAP (S1532). Otherwise (N in S1530), go to step 2;

Step 5) Sense the channel until a busy sensing slot is detected within the additional defer duration $T_d$ or all sensing slots within the additional defer duration $T_d$ are detected to be idle (S1560); and Step 6) If the channel is sensed to be idle for all the sensing slot durations of the additional defer duration $T_d$ (Y in S1570), go to step 4. Otherwise (N in S1570), go to step 5.

The following table shows that $m_p$, the minimum CW, the maximum CW, the MCOT, and the allowed CW sizes applied to the UL CAP vary according to a channel access priority class.

TABLE 11

| Channel Access Priority Class (p) | $M_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

The defer duration Ta is configured in the form of duration $T_f$ (16 us)+$m_p$ consecutive sensing slot durations $T_{sl}$ (9 us). $T_f$ includes the sensing slot duration $T_{sl}$ at the start of the 16 us duration.

$CW_{min,p} \leq CW_p \leq CW_{max,p}$. $CW_p$ may be configured as $CW_p = CW_{min,p}$, and may be updated before step 1 based on an explicit/implicit reception response to the previous UL burst (e.g., PUSCH) (CW size update). For example, $CW_p$ may be initialized to $CW_{min,p}$ based on an explicit/implicit reception response to the previous UL burst, may be increased to the next high allowed value, or maintain the existing value.

(2) Type 2 UL CAP

In Type 2 UL CAP, the length of the time duration spanned by the sensing slot that is sensed to be idle before transmission(s) is deterministic. Type 2 UL CAP is classified into Type 2A/2B/2C UL CAPs. In Type 2A UL CAP, the UE may perform transmission immediately after the channel is sensed to be idle for at least the sensing duration $T_{short\_dl}$=25 us. Here, $T_{short\_dl}$ is composed of a duration $T_f$ (=16 us) immediately followed by one sensing slot duration. In Type 2A UL CAP, $T_f$ includes a sensing slot at the start of the duration. In Type 2B UL CAP, the UE may perform transmission immediately after the channel is sensed to be idle for the sensing duration $T_f$=16 us. In Type 2B UL CAP, $T_f$ includes a sensing slot within the last 9 us of the duration. In Type 2C UL CAP, the UE does not sense the channel before performing transmission.

In order to improve reliability of transmission of a specific channel, a method of repeatedly transmitting the specific channel in a specific domain may be considered. For example, for repeated transmission of the specific channel, the specific channel may be repeatedly transmitted over several time units (e.g., slots/mini-slots/subframes/symbols/symbol groups, etc.) in the time domain. In the U-band, signal transmission may be performed only when signals from neighbor communication nodes are sensed to be less than a specific magnitude in the LBT/CAP. Accordingly, when repeated transmission is configured or indicated for the U-band, transmission by a predetermined number of repetitions may not be implemented due to a failure as a result of the LBT/CAP performed before the repeated transmission. This may cause a decrease in reliability of channel transmission, which may be more undesirable when reliability of traffic transmission is important, as in URLLC. Therefore, when N repeated transmissions (on a cell, BWP or carrier of the U-band) are required for a specific channel, a method for efficiently ensuring the repeated transmissions is required.

Hereinafter, method(s) for efficiently ensuring N repeated transmissions (on a cell, BWP, or carrier of the U-band) for a specific channel will be described.

In some implementations of the present disclosure, the UE may operate as a transmission device for UL transmission and as a reception device for downlink transmission. In some implementations of the present disclosure, the BS may operate as a reception device for UL transmission and as a reception device for UL transmission.

First, implementations of the present disclosure are described from the perspective of the reception device.

Implementation 1-1a

For a channel that requires N repeated transmissions (or in a case where the BS configures or indicates the minimum required repetition number N for the UE) in advance, the UE may receive scheduling information about N+K repeated transmissions (in case of failure of LBT/CAP), and the UE/BS may receive the channel, considering that the BS/UE succeeds in LBT/CAP and will perform N repeated transmissions starting on a transmission occasion where channel transmission is enabled. Alternatively, a rule may be defined such that resources (e.g., N+K slots/mini-slots/subframes/symbols/symbol groups) of a longer duration (or larger size) than the actually required resources (e.g., N slots/mini-slots/subframes/symbols/symbol groups) are allocated to the UE, and the actually required resources (e.g., N slots/mini-slots/subframes/symbols/symbol groups) from the time at which the LBT/CAP is successful are used as transmission resources.

For example, in order to determine whether to transmit a specific channel through the LBT/CAP, the transmission device may check whether the channel is idle. Thereby, resources to be actually used for repeated transmissions may be determined.

In this regard, information on N and N+K may be configured for the UE through a higher layer signal (e.g., RRC signal) from the BS, or may be indicated to the UE through a physical layer signal from the BS. For example, N may be configured through a higher layer signal (e.g., an RRC signal), and N+K (or K) may be indicated through a physical layer signal.

Implementation 1-2a

For channel transmission for which N repeated transmissions are scheduled (or in a case where the BS configures or indicates the minimum required repetition number N for the UE in advance) or a channel scheduled across N time units (e.g., slots/mini-slots/subframes/symbols/symbol groups, etc.), a rule may be defined such that, when it is actually difficult to secure resources as many as scheduled resources (due to failure of the LBT/CAP, or the like), the UE/BS operates, expecting the transmission device to drop transmission of the UL/DL channel. For example, the communication device (e.g., UE and/or BS) may skip the transmission/reception operation on a scheduled resource, not expecting transmission/reception of the PUSCH/PDSCH.

According to implementation 1-2a, when it is difficult to achieve specific reliability for a UL/DL channel, an operation of dropping the UL/DL channel transmission may be performed so as not to interfere with LBT/CAP of other communication devices.

For example, when the UE/BS fails to secure an idle channel due to failure of the LBT/CAP operation or the like and cannot satisfy the reliability required for the UL/DL channel transmission, the UE/BS may drop (or cancel) the UL/DL channel transmission scheduled for repeated transmission to prevent the LBT/CAP operation of other UEs from failing due to the repeated transmission operation of the UE/BS.

In some implementations of the present disclosure, scheduling N repeated transmissions or N time units may include allocating an amount of resources required to satisfy specific reliability of a channel transmission to the channel transmission.

For channel transmission for which N repeated transmissions are scheduled (or in a case where the BS configures or indicates the minimum required repetition number N for the UE in advance) or a channel scheduled across N time units (e.g., slots/mini-slots/subframes/symbols/symbol groups, etc.), a rule may be defined such that, when the transmit power has a margin within an allowable range, for example, when the transmit power in use is less than the maximum transmit power by a certain value or more while it is difficult to secure resources more than or as many as the resources for N repeated transmissions or N time units (due to failure of the LBT/CAP, or the like), the reception device receives a channel, considering that the transmission device will transmit the channel by reducing the number of repeated transmissions and/or increasing the transmit power while reducing the size of the transmission resources in the time domain to achieve the specific reliability. For example, for channel transmission requiring 4 repeated transmissions, when the LBT/CAP fails, the transmission device may perform 3 dB power boosting for a UL/DL channel to be transmitted, and then repeatedly transmit the UL/DL channel twice. The reception device may receive the UL/DL channel, considering that 3 dB power boosting is applied to the UL/DL channel and that the UL/DL channel will be transmitted twice. When repeating the transmission twice is impossible due to continuous failures of the LBT/CAP, the UL/DL channel may be transmitted once after 6 dB power boosting.

Implementation 1-3a

For channel transmission for which N repeated transmissions are scheduled (or in a case where the BS configures or indicates the minimum required repetition number N for the UE in advance) or a channel scheduled across N time units (e.g., slots/mini-slots/subframes/symbols/symbol groups, etc.), a rule may be defined such that when it is difficult to secure resources more than or as many as the resources required for the repeated transmissions within the channel occupancy time (COT) (due to LBT/CAP failure, etc.), the UE/BS may change the LBT/CAP type and re-perform the LBT/CAP to secure as many resources as necessary, and the reception device receives the UL/DL channel considering the secured resources.

Here, the maximum time of the COT may be determined according to the data type transmitted after success in the LBT/CAP. For example, the data types may correspond to four CAP priority classes according to a predetermined rule, respectively. The maximum COT value for each CAP priority class may be predefined or may be provided to the UE through higher layer signaling or physical layer signaling.

For example, when the time of x ms is required for N repeated transmissions, the UE may perform Type 2 LBT/CAP to allocate (or secure) the transmission time of the UE/BS corresponding to x ms within the COT of k ($>$x) ms secured by the BS. However, when the UE fails to perform the Type 2 LBT/CAP operation, it may perform Type 1 LBT/CAP again to secure the COT of the UE/BS for N repeated transmissions.

For example, when the COT k secured by the BS is 8 and the time x required for the UE/BS to perform N repeated transmissions of the PUSCH/PDSCH is 3, the BS may provide the UE with signaling indicating that a 6 ms time duration from slot #n+2 to slot #n+7 is included in the COT of 8 ms (slot #n to slot #n+7) secured by the BS, and correspond to UL slots available for (N) repeated transmissions. Alternatively, it may transmit to the UE a signal containing information related to an indication that Type 2 LBT/CAP is available for the UE transmission for the duration from slot #n+2 to slot #n+7. When the UE succeeds in Type 2 LBT/CAP immediately before slot #n+5, it may perform N repeated transmissions for 3 ms of slot #n+5 to slot #n+7. On the other hand, when the UE fails in Type 2 LBT/CAP immediately before slot #n+5, the UE may perform Type 1 LBT/CAP, not the Type 2 LBT/CAP explicitly/implicitly indicated by the BS. Then, after succeeding in the LBT/CAP, the UE may perform N repeated transmissions for 3 ms of slot #n+6 to slot #n+8 in the COT that the UE has acquired. The operation of enabling the UE to perform transmission after Type 2 LBT/CAP within the COT acquired by the BS may be equally applied to the case where the BS performs transmission after Type 2 LBT/CAP within the COT acquired by the UE.

Implementation 1-4a

For channel transmission for which N repeated transmissions are scheduled (or in a case where the BS configures or indicates the minimum required repetition number N for the UE in advance), a rule may be defined such that the same TB is repeatedly scheduled for each LBT/CAP subband (subband group), the UE/BS repeatedly transmits the TB in all (or a predefined/preconfigured number of) LBT/CAP subbands (subband groups) in which the LBT/CAP is successful (or transmits the TB by differently applying the redundancy version for the same TB according to a predefined/preconfigured/pre-indicated rule), and the reception device receives the TB, considering that the UE/BS will operate as described above.

In this case, transmitting the TB in all LBT/CAP subbands (subband groups) in which the LBT/CAP is successful may be intended to increase reliability. Transmitting the TB in (a predefined/preconfigured number of) some LBT/CAP subbands (subband groups) among the LBT/CAP subbands of subband groups in which the LBT/CAP is successful may be intended for power saving and/or interference control. In the case of UL, the actual transmission LBT/CAP subband (group) may be determined in consideration of the power of the UE, and the BS may perform the reception operation, assuming that the UE performs repeated transmissions in the maximum number of LBT/CAP subbands (subband groups) within the range where the power of the UE is allowed (or transmit the same TB to which the redundancy version is applied differently according to a predefined/preconfigured/pre-indicated rule).

In some implementations, for example, in order to obtain a diversity effect even when a DL/UL channel is scheduled in only one subband, the LBT/CAP may be attempted in a plurality of LBT/CAP subbands (subband groups) and the BS/UE may receive the DL/UL channel, assuming that the counterpart UE/BS will transmit the DL/UL channel in a successful LBT/CAP subband (subband group). Alternatively, for channel transmission corresponding to a plurality of configured/indicated subbands, when the LBT/CAP is successful for some subband(s) of the plurality of subbands, the UE/BS may receive the channel, assuming that actual transmission will be performed for only specific subband(s) (e.g., a subband of the lowest index, a subband to which RV0 is applied, etc.) or for subband(s) including the specific subband(s), in consideration of power and/or requirements defined in a regulation, or according to a predefined/preconfigured regulation.

In some implementations of the present disclosure, in scheduling channel transmission/reception, the BS may indicate frequency domain resource allocation (FDRA) for one subband (group) to the UE through DCI. FDRA for the remaining subbands (subband groups) may be determined based on the FDRA transmitted/received through the DCI by duplicating the FDRA.

When a specific TB is allocated over a subband group, the following operation may be considered.

Option 1: A channel allocated over a subband group may be transmitted only when the LBT/CAP operation is successful for all subbands in the subband group.

Option 2: For a channel allocated over a subband group, when the LBT/CAP operation fails in some subbands, the transmission of the channel may be dropped or may be performed by concatenating successful subbands. For example, when resource blocks (RBS) #10 to #20 are allocated to each of LBT subbands 1, 2 and 3 for one TB transmission, and the LBT/CAP operation is successful only in subbands 1 and 3, RBs #10 to #20 for subband 1 and RBs #10 to #20 for subband 3 may be concatenated, and the TB may be transmitted through the concatenated channel. Alternatively, in the case of retransmission, the TB may be transmitted using only the LBT/CAP subbands (subband groups) as many as those used for the previous transmission among the successful LBT/CAP subbands (subband groups) for the same resource allocation as the previous transmission.

In some implementations of the present disclosure, the UL power may be determined to match the target power according to the actual number of transmission subbands (according to success in the LBT/CAP), and the BS may receive a UL channel in consideration thereof. For example, when the power given when the LBT/CAP is successful in a subband is p, power of p/2 may be allocated when the LBT/CAP is successful in two subbands, and power of p/3 may be allocated when the LBT/CAP is successful in three subbands. Alternatively, in the case where there is the maximum power value (p_max) defined in the U-band, when the power given when the LBT/CAP is successful in a subband is p, a power value of max(p_max/2, p) may be allocated per subband when the LBT/CAP is successful in two subbands, and a power value of max(p_max/3, p) may be allocated per subband when the LBT/CAP is successful in three subbands.

Implementation 1-5a

For channel transmission for which N repeated transmissions are scheduled (or in a case where the BS presets or pre-indicates the minimum required repetition number N for the UE), or when N repetitions are indicated for a specific TB, 2-dimensional resource repetition of configuring/allocating A LBT/CAP subband(s) (or A carrier(s)) and B time unit(s) (e.g., slots/mini-slots/subframes/symbols/symbol groups, etc.) for the repeated transmissions may be considered. For example, the methods disclosed below may be considered. Hereinafter, for simplicity, a resource defined by one LBT/CAP subband in the frequency domain and one time unit in the time domain is referred to as a resource unit.

Option 1: When the transmission device succeeds in LBT in M (<N) subbands, the reception device may receive the TB, assuming that the TB will be transmitted in {M subbands*K time units}. Here, in order to allow the M*K resource units to sufficiently cover N repeated transmissions, K may be set as K=ceil(N/M). For example, when LBT is successful in M subbands fewer than the number of scheduled repeated transmissions (N), the UE may perform the repeated transmissions in K=ceil(N/M) time units in the time domain and M subbands in the frequency domain to satisfy the repeated transmission number that satisfies the required reliability.

Option 2: When the transmission device succeeds in LBT in M (<N) subbands, the reception device may receive the TB, assuming that the TB will be transmitted in {M subbands*K time units+'N−M*K' resource units}. Here, K may be K=floor(N/M), and 'N−M*K' denotes the number of remaining transmissions for achieving the N repeated transmissions in M*K transmissions. For subband selection for transmission in 'N−M*K' subbands in the last time unit, the following may be considered. For example, unlike in Option 1, when resources in the time domain are insufficient (or when resources in the frequency domain are additionally available), the transmission device may perform repeated transmissions in K=floor(N/M) time units in the time domain, M subbands in the frequency domain, and then 'N−M*K' subbands in the frequency domain in one subsequent time unit to satisfy a repeated transmission number that satisfies the required reliability.

Option 2-1: A round-robin algorithm may be used from the lowest subband index to the highest subband index (or from the highest subband index to the lowest subband index) to select subbands for repeated transmissions. For example, using the round-robin algorithm, which is one of pre-emption scheduling algorithms designed for time division systems, subbands for repeated transmissions may be selected in ascending order of subband indexes (or descending order of subband indexes) without establishing priorities among the subbands.

Option 2-2: The BS/UE may autonomously select subband(s) for repeated transmissions. Based on the history of LBT/CAP, a subband in which a hidden node problem may have not occurred may be selected. In some implementations of the present disclosure, in the case of UL, the UE may report, to the BS, subbands selected to perform 'N−M*K' repeated transmissions, and/or the BS may indicate, to the UE, preferred subbands for selection.

Option 2-3: Priorities of subbands may be determined through a measurement result (e.g., signal strength related information such as a received signal strength indicator (RSSI)) of the UE. For example, the BS may determine the priorities of the subbands based on the RSSI, which is a measurement result of the UE, and may select subbands to perform the repeated transmissions, based on the determined priorities.

Option 2-4: A subband having a larger number of ACKs as a HARQ-ACK value for PDSCHs in a specific reference time unit may be considered to a higher priority. In some implementations of the present disclosure, the reference time unit may be predefined/predetermined or may be preconfigured for the UE through a higher layer signal (e.g., RRC signal) from the BS.

Option 3: On a basis that A configured/allocated LBT/CAP subband(s) (or A configured/allocated carrier(s)) and B time unit(s) (e.g., slots/mini-slots/subframes/symbols/symbol groups, etc.) satisfy the relationship of B<N<A*B, when the LBT/CAP is successful in only one subband, only repeated transmissions fewer than N may be allowed even if transmission is performed in B time units. In this case, the reception device may perform the reception operation, assuming that the transmission device will perform transmission in a successful LBT/CAP subband for 1 time unit or for B' time units, where B' is less than B, and then perform LBT in A LBT/CAP subbands again. The reception device may consider that this operation may be repeated several times until the transmission device is enabled to perform N or more transmissions in A*B resource units. This is because it may be more preferable for securing transmission resources to probabilistically increase the number of subbands in which the LBT/CAP may be successful. Here, B' may be predetermined/predefined or may be set by a higher layer signal (e.g., RRC signal) from the BS.

For example, on a basis that the minimum required repetition number is 6, when 4 LBT/CAP subbands and 4 time units are configured/allocated, the transmission device performs transmission in a subband for the first time unit if the transmission device succeeds in the LBT/CAP only in the subband in the first time unit. Thereafter, in the second time unit, the LBT/CAP is performed again in four subbands in the second time unit. When the LBT/CAP is successful in two subbands, transmission may be performed in the two subbands for the remaining three time units. Accordingly, a total of 7 repeated transmissions may be performed.

In some implementations of the present disclosure, whether to perform transmission in the one successful LBT/CAP subband for one or more (fewer than N) time unit(s) may be determined by the size of the back-off counter for reattempt of the LBT/CAP. For example, in a case where the back-off counter is greater than or equal to a specific value, the probability of success in LBT/CAP may be relatively low, and accordingly transmission may be performed in the one successful LBT/CAP subband for one or more (fewer than N) time unit(s). In the opposite case, transmission may not be performed.

This option may include an operation in which the transmission device reattempts the LBT/CAP for each time unit (or every predetermined time duration) according to the number of subbands in which the LBT/CAP is successful.

In the case of the two-dimensional resource repetition, when a power-limited situation occurs regarding the UL power of the UE or when a power spectral density (PSD) regulation per frequency is applied regarding a PSD level by regulation, the BS may receive UL transmission from the UE, expecting that the UE will reduce the number of subbands for repeated transmissions and increase the transmission time units step-by-step until the UE enters a non-power-limited situation or the power becomes lower than the PSD regulation per frequency by the regulation.

In some implementations of the present disclosure, in the case of the two-dimensional resource repetition, when the total transmit power of the UE, which is one of the power-limited situations regarding the UL power of the UE, is greater than Pcmax, which is a preset specific power value, the number of subbands for repeated transmissions may be reduced and the number of time units may be increased step by step until the total transmit power becomes lower than Pcmax.

For example, the UE may reduce the number of subbands for repeated transmissions from {4 LBT/CAP subbands*1 time unit} to {2 LBT/CAP subbands*2 time units} to {1 LBT/CAP subbands*4 time units} and increase the number of time units.

As another example, when 23 dBm is the maximum transmit power by regulation and the LBT/CAP is successful in two subbands, a transmit power up to 20 dBm may be allowed in one subband. In this case, when the power allocated by the BS is greater than 20 dBm, increasing the number of time units while reducing the number of subbands for transmissions may result in a need for more time units for the repeated transmissions. Reducing the number of time units for transmissions due to increase in the number of successful LBT/CAP subbands may also result in a need for more time units.

Therefore, as another method, when the transmit power allocated for a specific time unit by the BS is P, a rule may be defined such that the BS reserves UL transmission from the UE, assuming that the UE will determine the number of LBT/CAP subbands to be actually used for transmissions, and/or the total transmission time units, and/or transmit power to be used in an LBT/CAP subband in consideration of the number of repetitions, and/or the number of subbands in which the LBT/CAP is successful, and/or the maximum transmit power (in the time unit(s) corresponding to a specific duration) by the regulation, and the like etc. Here, P may be irrelevant to the number of LBT/CAP subbands to be used for channel transmission of the UE, or may be a value provided on the assumption that transmission is performed in an LBT/CAP subband. In this regard, the number of LBT/CAP subbands to be actually used for transmission may be less than the number of subbands in which the LBT/CAP is successful. The number of LBT/CAP subbands to be actually used for transmission may be set for the UE through a higher layer signal or may be indicated to the UE through a physical layer signal. The LBT/CAP subband(s) to be actually used for transmission may be selected according to the schemes of Option 2-1 to Option 2-4. More specifically, when latency is important, the transmit power to be used in an LBT/CAP subband may be determined such that the total number of transmission time units is minimized. When the transmit power of the UE does not have a sufficient margin due to the PSD regulation and/or scheduling in carrier aggregation (CA), the total number of transmission time units may be determined on the assumption that the transmit power to be used in an LBT/CAP subband is P or a lower value (e.g., a value obtained by dividing P by the number of LBT/CAP subbands).

Alternatively, N repeated transmissions to achieve a specific level of reliability in the proposed methods may be applied when transmission is performed at a specific reference power P_ref. The value of P_ref may be predefined or configured/indicated. The value of N may be interpreted differently depending on the actual transmission value P compared to P_ref. For example, when P=P_ref/2, the proposed methods may need to be applied to satisfy 2*N.

Alternatively, N repeated transmissions to achieve the specific level of reliability in the proposed methods may be applied to transmission in a specific reference number (S) of subbands. The value of S may be predefined or configured/indicated. The value of N may be interpreted differently depending on the value of the number of actual transmission subbands compared to the value of S. As an example, when S=2 is defined, but the number of actual transmission subbands is 4, the above proposed methods may need to be applied to satisfy 2*N.

The two-dimensional resource repetition scheme may also be applied to downlink semi-persistent scheduling (SPS) or transmission in a configured grant. For example, when traffic occurs while A LBT/CAP subband(s) (or A carrier(s)) and B time unit(s) (e.g., slots/mini-slots/subframes/symbols/symbol groups, etc.) are configured/allocated, the reception device may receive PDSCH/PUSCH, expecting that the transmission device will transmit the PDSCH/PUSCH in one subband or multiple subbands in one subband or multiple subbands in which the LBT is successful using the above method(s).

Examples of the proposed methods described above may also be included as one of the implementation methods of the present disclosure, and thus may be regarded as a kind of proposed method. In addition, the described proposed methods may be implemented independently, or a combination (or merge) of some proposed methods may be implemented. A rule may be defined such that the information about whether the proposed methods are applied (or information on the rules of the proposed methods) is delivered to the UE by the BS through a predefined signal (e.g., a physical layer signal or a higher layer signal). In addition, the proposed methods described in the present disclosure and methods extendable therefrom may be implemented as an apparatus, and the present disclosure includes the content of apparatuses implementing the proposed method(s).

Hereinafter, the above-described implementations of the present disclosure will be described again from the perspective of the transmission device.

Implementation 1-1b

For channel transmission requiring N repeated transmissions (or when the BS presets or pre-indicates the minimum required repetition number N for the UE), the UE/BS receives/transmits scheduling information about N+K repeated transmissions (in case of failure of LBT/CAP), and performs the N repeated transmissions from the time when the LBT/CAP is successful. Alternatively, a rule may be defined such that resources (e.g., N+K slots/mini-slots/subframes/symbols/symbol groups) of a longer duration (or larger size) than the actually required resources (e.g., N slots/mini-slots/subframes/symbols/symbol groups) are allocated and the actually required resources (e.g., N slots/mini-slots/subframes/symbols/symbol groups) from the time at which the LBT/CAP is successful are used as transmission resources. Here, information on N and N+K may be configured by the BS for the UE through a higher layer signal, or may be indicated to the UE through a physical layer signal. N may be configured through a higher layer signal and N+K (or K) may be indicated through a physical layer signal.

For example, the transmission device may check whether the channel is idle in order to determine whether to transmit a specific channel through the LBT/CAP. Thereby, resources to be actually used for repeated transmissions may be determined.

Implementation 1-2b

For channel transmission for which N repeated transmissions are scheduled (or in a case where the BS configures or indicates the minimum required repetition number N for the UE in advance) or a channel scheduled across N time units (e.g., slots/mini-slots/subframes/symbols/symbol groups, etc.), a rule may be defined such that, when it is actually difficult to secure resources as many as scheduled resources (due to failure of the LBT/CAP, or the like), the UE/BS operates, expecting the transmission device to drop transmission of the UL/DL channel.

According to implementation 1-2b, when it is difficult to achieve specific reliability for a UL/DL channel, an operation of dropping the UL/DL channel transmission may be performed so as not to interfere with LBT/CAP of other communication devices. Scheduling the repeated transmissions or N time units may include allocating an amount of resources required to satisfy specific reliability of a channel transmission to the channel transmission. In some implementations of the present disclosure, the dropping operation is performed because it may be better not to interfere with the LBT/CAP of other communication devices if it is difficult to achieve the specific reliability.

For example, when the UE/BS fails to secure an idle channel due to failure of the LBT/CAP operation or the like and cannot satisfy the reliability required for the UL/DL channel transmission, the UE/BS may drop (or cancel) the UL/DL channel transmission scheduled for repeated transmission to prevent the LBT/CAP operation of other UEs from failing due to the repeated transmission operation of the UE/BS.

For channel transmission for which N repeated transmissions are scheduled (or in a case where the BS configures or indicates the minimum required repetition number N for the UE in advance) or a channel scheduled across N time units (e.g., slots/mini-slots/subframes/symbols/symbol groups, etc.), a rule may be defined such that, when the transmit power has a margin within an allowable range, for example, when the transmit power in use is less than the maximum transmit power by a certain value or more while it is difficult to secure resources more than or as many as the resources for N repeated transmissions or N time units (due to failure of the LBT/CAP, or the like), the UE/BS transmits the channel by reducing the number of repeated transmissions and/or increasing the transmit power while reducing the size of the transmission resources in the time domain to achieve the specific reliability. For example, for channel transmission requiring 4 repeated transmissions, when the LBT/CAP fails, the transmission device may perform 3 dB power boosting for a UL/DL channel to be transmitted, and then repeatedly transmit the UL/DL channel twice. When repeating the transmission twice is impossible due to continuous failures of the LBT/CAP, the UL/DL channel may be transmitted once after 6 dB power boosting.

Implementation 1-3a

For channel transmission for which N repeated transmissions are scheduled (or in a case where the BS configures or indicates the minimum required repetition number N for the UE in advance) or a channel scheduled across N time units (e.g., slots/mini-slots/subframes/symbols/symbol groups, etc.), a rule may be defined such that when it is difficult to secure resources more than or as many as the resources required for the repeated transmissions within the channel occupancy time (COT) (due to LBT/CAP failure, etc.), the UE/BS may change the LBT/CAP type and re-perform the LBT/CAP to secure as many resources as necessary.

Here, the maximum time of the COT may be determined according to the data type transmitted after success in the LBT/CAP. For example, the data types may correspond to four CAP priority classes according to a predetermined rule, respectively. The maximum COT value for each CAP priority class may be predefined or may be provided to the UE through higher layer signaling or physical layer signaling.

For example, when the time of x ms is required for N repeated transmissions, the UE may perform Type 2 LBT/CAP to allocate (or secure) the transmission time of the UE/BS corresponding to x ms within the COT of k (>x) ms secured by the BS. However, when the UE fails to perform the Type 2 LBT/CAP operation, it may perform Type 1 LBT/CAP again to secure the COT of the UE/BS for N repeated transmissions. However, when the UE fails to perform the Type 2 LBT/CAP operation, it may perform Type 1 LBT/CAP again to secure the COT of the UE/BS for N repeated transmissions For example, when the COT k secured by the BS is 8 and the time x required for the UE/BS to perform N repeated transmissions of the PUSCH/PDSCH is 3, the BS may provide the UE with signaling indicating that a 6 ms time duration from slot #n+2 to slot #n+7 is included in the COT of 8 ms (slot #n to slot #n+7) secured by the BS, and correspond to UL slots available for (N) repeated transmissions. Alternatively, it may transmit to the UE a signal containing information related to an indication that Type 2 LBT/CAP is available for the UE transmission for the duration from slot #n+2 to slot #n+7. When the UE succeeds in Type 2 LBT/CAP immediately before slot #n+5, it may perform N repeated transmissions for 3 ms of slot #n+5 to slot #n+7. On the other hand, when the UE fails in Type 2 LBT/CAP immediately before slot #n+5, the UE may perform Type 1 LBT/CAP, not the Type 2 LBT/CAP explicitly/implicitly indicated by the BS. Then, after succeeding in the LBT/CAP, the UE may perform N repeated transmissions for 3 ms of slot #n+6 to slot #n+8 in the COT that the UE has acquired. The operation of enabling the UE to perform transmission after Type 2 LBT/CAP within the COT acquired by the BS may be equally applied to the case where the BS performs transmission after Type 2 LBT/CAP within the COT acquired by the UE.

Figure 15:
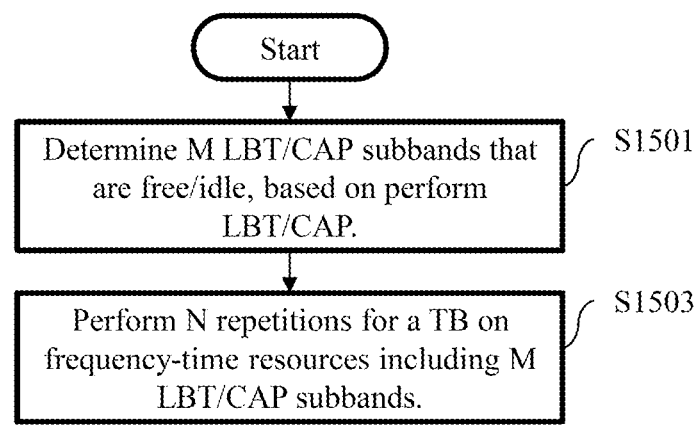
FIG. 15 illustrates a flow of repetitive transmission including repetition in the frequency domain in accordance with some implementations of the present disclosure.

FIG. 15 illustrates a flow of repetitive transmission including repetition in the frequency domain in accordance with some implementations of the present disclosure. For example, transmission of a TB may be repeated in the frequency domain (as well as the time domain) according to implementation 1-4b and/or implementation 1-5b.

Implementation 1-4b

Referring to FIG. 15, for channel transmission for which N repeated transmissions are scheduled (or in a case where the BS configures or indicates the minimum required repetition number N for the UE in advance), the same TB is repeatedly scheduled for each LBT/CAP subband (subband group), and the UE/BS performs the LBT/CAP for the LBT/CAP subbands before transmitting the TB (S1501). The UE/BS may repeatedly transmit the TB in all (or a predefined/preconfigured number of) LBT/CAP subbands (subband groups) in which the LBT/CAP is successful (or transmit the TB by differently applying the redundancy version for the same TB according to a predefined/preconfigured/pre-indicated rule) (S1503).

In this case, transmitting the TB in all LBT/CAP subbands (subband groups) in which the LBT/CAP is successful may be intended to increase reliability. Transmitting the TB in (a predefined/preconfigured number of) some LBT/CAP subbands (subband groups) among the LBT/CAP subbands of subband groups in which the LBT/CAP is successful may be intended for power saving and/or interference control. In the case of UL, the actual transmission LBT/CAP subband (group) may be determined in consideration of the power of the UE, and the UE may perform repeated transmissions in the maximum number of LBT/CAP subbands (subband groups) within the range where the power of the UE is allowed (or transmit the same TB to which the redundancy version is applied differently according to a predefined/preconfigured/pre-indicated rule).

In some implementations, for example, in order to obtain a diversity effect even when a DL/UL channel is scheduled in only one subband, the LBT/CAP may be attempted in a plurality of LBT/CAP subbands (subband groups) and the BS/UE may transmit the DL/UL channel in a successful LBT/CAP subband (subband group). Alternatively, for channel transmission corresponding to a plurality of configured/indicated subbands, when the LBT/CAP is successful for some subband(s) of the plurality of subbands, actual transmission may be performed for only specific subband(s) (e.g., a subband of the lowest index, a subband to which RV0 is applied, etc.) or for subband(s) including the specific subband(s), in consideration of power and/or requirements defined in a regulation, or according to a predefined/preconfigured regulation.

In some implementations of the present disclosure, in scheduling channel transmission/reception, the BS may indicate frequency domain resource allocation (FDRA) for one subband (group) to the UE through DCI. FDRA for the remaining subbands (subband groups) may be determined based on the FDRA transmitted/received through the DCI by duplicating the FDRA.

When a specific TB is allocated over a subband group, the following operation may be considered.

Option 1: A channel allocated over a subband group may be transmitted only when the LBT/CAP operation is successful for all subbands in the subband group.

Option 2: For a channel allocated over a subband group, when the LBT/CAP operation fails in some subbands, the transmission of the channel may be dropped or may be performed by concatenating successful subbands. For example, when resource blocks (RBS) #10 to #20 are allocated to each of LBT subbands 1, 2 and 3 for one TB transmission, and the LBT/CAP operation is successful only in subbands 1 and 3, RBs #10 to #20 for subband 1 and RBs #10 to #20 for subband 3 may be concatenated, and the TB may be transmitted through the concatenated channel. Alternatively, in the case of retransmission, the TB may be transmitted using only the LBT/CAP subbands (subband groups) as many as those used for the previous transmission among the successful LBT/CAP subbands (subband groups) for the same resource allocation as the previous transmission.

In some implementations of the present disclosure, the UL power may be determined to match the target power according to the actual number of transmission subbands (according to success in the LBT/CAP). For example, when the power given when the LBT/CAP is successful in a subband is p, power of p/2 may be allocated when the LBT/CAP is successful in two subbands, and power of p/3 may be allocated when the LBT/CAP is successful in three subbands. Alternatively, in the case where there is the maximum power value ($p\_max$) defined in the U-band, when the power given when the LBT/CAP is successful in a subband is p, a power value of $max(p\_max/2, p)$ may be allocated per subband when the LBT/CAP is successful in two subbands, and a power value of $max(p\_max/3, p)$ may be allocated per subband when the LBT/CAP is successful in three subbands.

Implementation 1-5b

For channel transmission for which N repeated transmissions are scheduled (or in a case where the BS configures or indicates the minimum required repetition number N for the UE in advance), or when N repetitions are indicated for a specific TB, 2-dimensional resource repetition of configuring/allocating A LBT/CAP subband(s) (or A carrier(s)) and B time unit(s) (e.g., slots/mini-slots/subframes/symbols/symbol groups, etc.) for the repeated transmissions may be considered. For example, the methods disclosed below may be considered.

Option 1: The transmission device may perform the LBT/CAP before transmitting a TB in the U-band and determine free or idle LBT/CAP subband(s) (S1501). When the transmission device succeeds in the LBT in M (<N) subbands, the TB may be transmitted in {M subbands*K time units} (S1503). Here, in order to allow the M*K resource units to sufficiently cover N repeated transmissions, K may be set as K=ceil(N/M). For example, when LBT is successful in M subbands fewer than the number of scheduled repeated transmissions (N), the UE may perform the repeated transmissions in K=ceil(N/M) time units in the time domain and M subbands in the frequency domain to satisfy the repeated transmission number that satisfies the required reliability.

Option 2: The transmission device may perform the LBT/CAP before transmitting a TB in the U-band and determine free or idle LBT/CAP subband(s) (S1501). When the transmission device succeeds in the LBT in M (<N) subbands, the TB may be transmitted in {M subbands*K time units+'N-M*K' resource units} (S1503). Here, K may be K=floor(N/M), and 'N-M*K' denotes the number of remaining transmissions for achieving the N repeated transmissions in M*K transmissions. For subband selection for transmission in 'N-M*K' subbands in the last time unit, the following may be considered. For example, unlike in Option 1, when resources in the time domain are insufficient (or when resources in the frequency domain are additionally available), the transmission device may perform repeated transmissions in K=floor(N/M) time units in the time domain, M subbands in the frequency domain, and then 'N-M*K' subbands in the frequency domain in one subsequent time unit to satisfy a repeated transmission number that satisfies the required reliability.

Option 2-1: A round-robin algorithm may be used from the lowest subband index to the highest subband index (or from the highest subband index to the lowest subband index) to select subbands for repeated transmissions. For example, using the round-robin algorithm, which is one of pre-emption scheduling algorithms designed for time division systems, subbands for repeated transmissions may be selected in ascending order of subband indexes (or descending order of subband indexes) without establishing priorities among the subbands.

Option 2-2: The BS/UE may autonomously select subband(s) for repeated transmissions. Based on the history of LBT/CAP, a subband in which a hidden node problem may have not occurred may be selected. In some implementations of the present disclosure, in the case of UL, the UE may report, to the BS, subbands selected to perform 'N−M*K' repeated transmissions, and/or the BS may indicate, to the UE, preferred subbands for selection.

Option 2-3: Priorities of subbands may be determined through a measurement result (e.g., signal strength related information such as a received signal strength indicator (RSSI)) of the UE. For example, the BS may determine the priorities of the subbands based on the RSSI, which is a measurement result of the UE, and may select subbands to perform the repeated transmissions, based on the determined priorities.

Option 2-4: A subband having a larger number of ACKs as a HARQ-ACK value for PDSCHs in a specific reference time unit may be considered to a higher priority. In some implementations of the present disclosure, the reference time unit may be predefined/predetermined or may be preconfigured for the UE through a higher layer signal (e.g., RRC signal) from the BS.

Option 3: The transmission device may perform the LBT/CAP before transmitting a TB in the U-band and determine free or idle LBT/CAP subband(s) (S1501). A configured/allocated LBT/CAP subband(s) (or A configured/allocated carrier(s)) and B time unit(s) (e.g., slots/mini-slots/subframes/symbols/symbol groups, etc.) satisfy the relationship of B<N<A*B, when the LBT/CAP is successful in only one subband, only repeated transmissions fewer than N may be allowed even if transmission is performed in B time units. In this case, the transmission device may perform transmission in a successful LBT/CAP subband for 1 time unit or for B' time units, where B' is less than B, and then perform LBT in A LBT/CAP subbands again. The transmission device may repeat this operation several times until the transmission device is enabled to perform N or more transmissions in A*B resource units. This is because it may be more preferable for securing transmission resources to probabilistically increase the number of subbands in which the LBT/CAP may be successful. Here, B' may be predetermined/predefined or may be set by a higher layer signal (e.g., RRC signal) from the BS.

For example, on a basis that the minimum required repetition number is 6, when 4 LBT/CAP subbands and 4 time units are configured/allocated, the transmission device performs transmission in a subband for the first time unit if the transmission device succeeds in the LBT/CAP only in the subband in the first time unit. Thereafter, in the second time unit, the LBT/CAP is performed again in four subbands in the second time unit. When the LBT/CAP is successful in two subbands, transmission may be performed in the two subbands for the remaining three time units. Accordingly, a total of 7 repeated transmissions may be performed.

In some implementations of the present disclosure, whether to perform transmission in the one successful LBT/CAP subband for one or more (fewer than N) time unit(s) may be determined by the size of the back-off counter for reattempt of the LBT/CAP. For example, in a case where the back-off counter is greater than or equal to a specific value, the probability of success in LBT/CAP may be relatively low, and accordingly transmission may be performed in the one successful LBT/CAP subband for one or more (fewer than N) time unit(s). In the opposite case, transmission may not be performed.

This option may include an operation in which the transmission device reattempts the LBT/CAP for each time unit (or every predetermined time duration) according to the number of subbands in which the LBT/CAP is successful.

In the case of the two-dimensional resource repetition, when a power-limited situation occurs regarding the UL power of the UE or when a PSD regulation per frequency is applied regarding a PSD level by regulation, the UE may reduce the number of subbands for repeated transmissions and increase the transmission time units step-by-step until the UE enters a non-power-limited situation or the power becomes lower than the PSD regulation per frequency by the regulation.

In some implementations of the present disclosure, in the case of the two-dimensional resource repetition, when the total transmit power of the UE, which is one of the power-limited situations regarding the UL power of the UE, is greater than Pcmax, which is a preset specific power value, the number of subbands for repeated transmissions may be reduced and the number of time units may be increased step by step until the total transmit power becomes lower than Pcmax.

For example, the UE may reduce the number of subbands for repeated transmissions from {4 LBT/CAP subbands*1 time unit} to {2 LBT/CAP subbands*2 time units} to {1 LBT/CAP subbands*4 time units} and increase the number of time units.

As another example, when 23 dBm is the maximum transmit power by regulation and the LBT/CAP is successful in two subbands, a transmit power up to 20 dBm may be allowed in one subband. In this case, when the power allocated by the BS is greater than 20 dBm, increasing the number of time units while reducing the number of subbands for transmissions may result in a need for more time units for the repeated transmissions. Reducing the number of time units for transmissions due to increase in the number of successful LBT/CAP subbands may also result in a need for more time units.

Therefore, as another method, when the transmit power allocated for a specific time unit by the BS is P, a rule may be defined such that the BS reserves UL transmission from the UE, assuming that the UE will determine the number of LBT/CAP subbands to be actually used for transmissions, and/or the total transmission time units, and/or transmit power to be used in an LBT/CAP subband in consideration of the number of repetitions, and/or the number of subbands in which the LBT/CAP is successful, and/or the maximum transmit power (in the time unit(s) corresponding to a specific duration) by the regulation, and the like etc. Here, P may be irrelevant to the number of LBT/CAP subbands to be used for channel transmission of the UE, or may be a value provided on the assumption that transmission is performed in an LBT/CAP subband. In this regard, the number of LBT/CAP subbands to be actually used for transmission may be less than the number of subbands in which the LBT/CAP is successful. The number of LBT/CAP subbands to be actually used for transmission may be set for the UE through a higher layer signal or may be indicated to the UE through a physical layer signal. The LBT/CAP subband(s) to be actually used for transmission may be selected according to the schemes of Option 2-1 to Option 2-4. More specifically, when latency is important, the transmit power to be used in an LBT/CAP subband may be determined such that the total number of transmission time units is minimized. When the transmit power of the UE does not have a sufficient margin due to the PSD regulation and/or scheduling in carrier aggregation (CA), the total number of transmission time units may be determined on the assumption that the transmit power to be used in an LBT/CAP subband is P or a lower value (e.g., a value obtained by dividing P by the number of LBT/CAP subbands).

Alternatively, N repeated transmissions to achieve the specific level of reliability in the proposed methods may be applied to transmission in a specific reference number (S) of subbands. The value of S may be predefined or configured/indicated. The value of N may be interpreted differently depending on the value of the number of actual transmission subbands compared to the value of S. As an example, when S=2 is defined, but the number of actual transmission subbands is 4, the above proposed methods may need to be applied to satisfy 2*N.

Alternatively, N repeated transmissions to achieve the specific level of reliability in the proposed methods may be applied to transmission in a specific reference number (S) of subbands. The value of S may be predefined or configured/indicated. The value of N may be interpreted differently depending on the value of the number of actual transmission subbands compared to the value of S. As an example, when S=2 is defined, but the number of actual transmission subbands is 4, the above proposed methods may need to be applied to satisfy 2*N.

The two-dimensional resource repetition scheme may also be applied to downlink semi-persistent scheduling (SPS) or transmission in a configured grant. For example, when traffic occurs while A LBT/CAP subband(s) (or A carrier(s)) and B time unit(s) (e.g., slots/mini-slots/subframes/symbols/symbol groups, etc.) are configured/allocated, the transmission device may transmit the PDSCH/PUSCH in one subband or multiple subbands in which the LBT is successful using the above method(s).

Examples of the proposed methods described above may also be included as one of the implementation methods of the present disclosure, and thus may be regarded as a kind of proposed method. In addition, the described proposed methods may be implemented independently, or a combination (or merge) of some proposed methods may be implemented. A rule may be defined such that the information about whether the proposed methods are applied (or information on the rules of the proposed methods) is delivered to the UE by the BS through a predefined signal (e.g., a physical layer signal or a higher layer signal). In addition, the proposed methods described in the present disclosure and methods extendable therefrom may be implemented as an apparatus, and the present disclosure includes the content of apparatuses implementing the proposed method(s).

Figure 16:
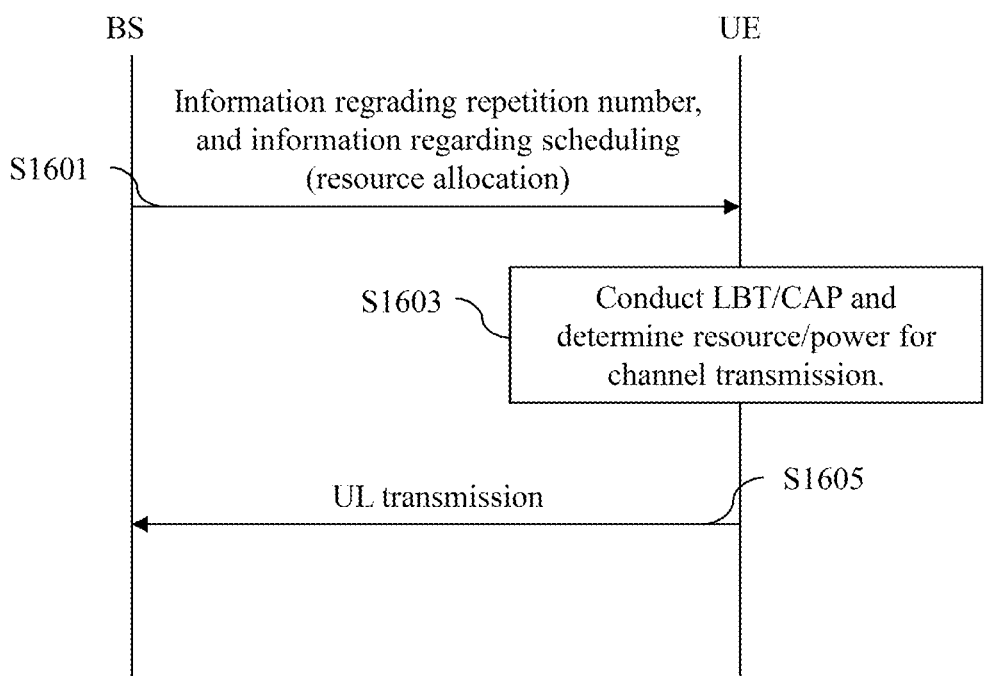
FIG. 16 illustrates a flow of repetition of a UL transmission in accordance with some implementations of the present disclosure.

FIG. 16 illustrates a flow of repetition of a UL transmission in accordance with some implementations of the present disclosure.

Referring to FIG. 16, the UE may receive information on a repetition number for a specific UL transmission and scheduling information (resource allocation information) from the BS (S1601), and secure resources required for the UL transmission by LBT/CAP and determine a transmission power (S1603), and perform the UL transmission in a U-band (S1605).

When repeated transmission configured/indicated for the U-band is allowed only in the time domain, and the LBT/CAP fails on a first transmission occasion, the transmission device may need to perform the LBT/CAP again on the next LBT/CAP occasion, and start the repeated transmission from a transmission occasion on which the LBT/CAP is successful. In addition, when the repeated transmission configured/indicated for the U-band is allowed only in the time domain, the repeated transmission may be performed only once in one time unit. However, the UE may perform the LBT/CAP for all LBT/CAP subbands on one LBT/CAP occasion, and may identify available LBT/CAP subbands through one LBT/CAP. Accordingly, as in some implementations of the present disclosure, when the repeated transmission is allowed in the frequency domain as well, the transmission device may be allowed to perform TB repeated transmission through a smaller number of LBTs/CAPs. Therefore, some implementations of the present disclosure may reduce the latency compared to the repeated transmission allowed only in the time domain. In addition, in some implementations of the present disclosure, since the repeated transmission is allowed even in the frequency domain, the probability of fulfilling a required repetition number may be increased.

According to the implementations of the present disclosure, the BS and/or UE may perform scheduling/resource allocation/power control, and the like in consideration of the reliability and latency of traffic and results of LBT/CAP in the U-band, and may thus use frequency, and/or time, and/or power resources more efficiently to transmit/receive the DL/UL control/data channel.

For transmitting a transport block (TB) on an unlicensed band, a transmission device may perform operations according to some implementations of the present disclosure. The transmitting device may include: at least one transceiver; at least one processor; and at least one computer memory operably connected to the at least one processor and configured to store instructions that, when executed, cause the at least one processor to perform the operations according to some implementations of the present disclosure. A processing device for a transmitting device may include: at least one processor; and at least one computer memory operably connected to the at least one processor and configured to store instructions that, when executed, cause the at least one processor to perform the operations according to some implementations of the present disclosure. A computer-readable storage medium may store at least one computer program including instructions that, when executed by at least one processor, cause the at least one processor to perform the operations according to some implementations of the present disclosure. The operations may include: determining M idle LBT subbands based on performing Listen Before Talk (LBT) for the U-band, where M>1; and performing N repeated transmissions for the TB in the M LBT subbands, where N>M. The N repeated transmissions for the TB may include M repeated transmissions performed in the M LBT subbands, respectively.

Performing the N repeated transmissions for the TB in the M LBT subbands may include: transmitting the TB with a different redundancy version.

The transmission device may be a UE. In the UE, the operations may include receiving frequency domain resource allocation (FDRA) for one LBT subband. In the UE, the operations may include determining the frequency resource allocation for each of the M LBT subbands based on the FDRA.

The transmission device may be a BS. In the BS, the operations may include transmitting frequency domain resource allocation (FDRA) for one LBT subband. In the BS, the operations may include determining frequency resource allocation for each of the M LBT subbands based on the FDRA.

The N repeated transmissions for the TB may be performed on M*K frequency-time resources defined by the M LBT subbands in the frequency domain and K time units in the time domain, where K=ceil(N/M).

The N repeated transmissions for the TB may be performed on M*K frequency-time resources and N−M*K frequency-time resources defined by the M LBT subbands in the frequency domain and K time units in the time domain, and K=floor(N/M).

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method for transmitting a transport block (TB) by a transmission device in a wireless communication system, the method comprising:
performing Listen Before Talk (LBT) for a plurality of subbands in a frequency domain to determine whether at least one idle subband among the plurality of subbands is idle; and
based on a determination that M subbands are idle among the plurality of subbands, performing N repeated transmissions for the TB in the M subbands, where N>1,
wherein, based on N≥M and M>1, the N repeated transmissions for the TB include M repeated transmissions performed respectively in the M subbands.

2. The method of claim 1, wherein N is configured by a higher layer signal or indicated by a physical layer signal.

3. The method of claim 1, wherein performing the N repeated transmissions for the TB in the M subbands comprises:
transmitting the TB with different redundancy versions.

4. The method of claim 1, further comprising:
receiving frequency domain resource allocation (FDRA) for one subband; and
based on N≥M and M>1, determining frequency resource allocation for each of the M subbands based on the FDRA.

5. The method of claim 1, further comprising:
transmitting frequency domain resource allocation (FDRA) for one subband; and
based on N≥M and M>1, determining frequency resource allocation for each of the M subbands based on the FDRA.

6. The method of claim 1, wherein the N repeated transmissions for the TB are performed on M*K frequency-time resources defined by the M subbands in a frequency domain and K time units in a time domain, and
wherein K=ceil (N/M).

7. The method of claim 1, wherein the N repeated transmissions for the TB are performed on M*K time-frequency resources and N-M*K frequency-time resources defined by the M subbands in a frequency domain and K time units in a time domain, and
wherein K=floor (N/M).

8. A transmission device configured to transmit a transport block (TB) in a wireless communication system, the transmission device comprising:
at least one transceiver;
at least one processor; and
at least one computer memory operably connectable to the at least one processor and having stored thereon instructions that, when executed, cause the at least one processor to perform operations comprising:
performing Listen Before Talk (LBT) for a plurality of subbands in a frequency domain to determine whether at least one idle subband among the plurality of subbands is idle; and
based on a determination that M subbands are idle among the plurality of subbands, performing N repeated transmissions for the TB in the M subbands, where N>1,
wherein, based on N≥M and M>1, the N repeated transmissions for the TB include M repeated transmissions performed respectively in the M subbands.

9. The transmission device of claim 8, wherein N is configured by a higher layer signal or indicated by a physical layer signal.

10. The transmission device of claim 8, wherein performing the N repeated transmissions for the TB in the M subbands comprises:
transmitting the TB with different redundancy versions.

11. The transmission device of claim 8, wherein the operations further comprise:
receiving frequency domain resource allocation (FDRA) for one subband; and
based on N≥M and M>1, determining frequency resource allocation for each of the M subbands based on the FDRA.

12. The transmission device of claim 8, wherein the operations further comprise:
transmitting frequency domain resource allocation (FDRA) for one subband; and
based on N≥M and M>1, determining frequency resource allocation for each of the M subbands based on the FDRA.

13. The transmission device of claim 8, wherein the N repeated transmissions for the TB are performed on M*K frequency-time resources defined by the M subbands in a frequency domain and K time units in a time domain, and
wherein K=ceil (N/M).

14. A non-transitory computer-readable storage medium having stored thereon at least one computer program including instructions that, when executed by at least one processor, cause the at least one processor to perform operations for a transmission device,
wherein the operations comprise:
performing Listen Before Talk (LBT) for a plurality of subbands in a frequency domain to determine whether at least one idle subband among the plurality of subbands is idle; and based on a determination that M subbands are idle among the plurality of subbands, performing N repeated transmissions for a transport block (TB) in the M LBT subbands, where N>1, wherein, based on N≥M and M>1, the N repeated transmissions for the TB include M repeated transmissions performed respectively in the M subbands.

15. The non-transitory computer-readable storage medium of claim 14, wherein N is configured by a higher layer signal or indicated by a physical layer signal.

16. The non-transitory computer-readable storage medium of claim 14, wherein performing the N repeated transmissions for the TB in the M subbands comprises:

transmitting the TB with different redundancy versions.

17. The non-transitory computer-readable storage medium of claim 14, wherein the operations further comprise:

receiving frequency domain resource allocation (FDRA) for one subband; and based on N≥M and M>1, determining frequency resource allocation for each of the M subbands based on the FDRA.

18. The non-transitory computer-readable storage medium of claim 14, wherein the operations further comprise:

transmitting frequency domain resource allocation (FDRA) for one subband; and based on N≥M and M>1, determining frequency resource allocation for each of the M subbands based on the FDRA.

19. The non-transitory computer-readable storage medium of claim 14, wherein the N repeated transmissions for the TB are performed on M*K frequency-time resources defined by the M subbands in a frequency domain and K time units in a time domain, and wherein K=ceil (N/M).

* * * * *